United States Patent Office 3,116,304
Patented Dec. 31, 1963

3,116,304
15-ALKYL STEROIDS
David Taub, Metuchen, and Norman L. Wendler, Summit, N.J., assignors to Merck & Co., Inc., Rahway, N.J., a corporation of New Jersey
No Drawing. Filed Nov. 2, 1961, Ser. No. 149,499
9 Claims. (Cl. 260—397.45)

This invention relates to 15-alkyl steroids. More specifically, this invention relates to 11-oxygenated 15-alkyl steroids of the pregnane series and to compounds of the formula—

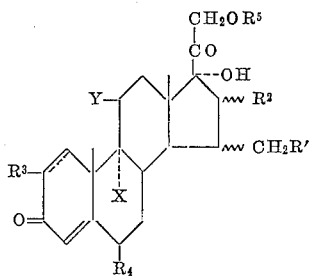

in which R', R$^2$ and R$^3$ are each hydrogen or alkyl, R$^4$ may be hydrogen, halogen or alkyl, R$^5$ can be hydrogen or lower alkanoyl, X may be hydrogen, halogen and together with Y a 9,11 double bond, Y may be β-hydroxyl, keto oxygen and together with X a 9,11 double bond, the dotted line in ring A indicates either a single or double $C_1$–$C_2$ bond and the wavy lines at carbons 15 and 16 indicate either α or β substituents. More specifically, also, this invention relates to new steroid intermediates, especially compounds of the formula—

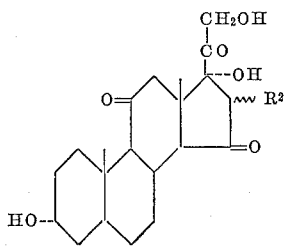

in which R$^2$ may be α or β-alkyl and also to compounds of the formula—

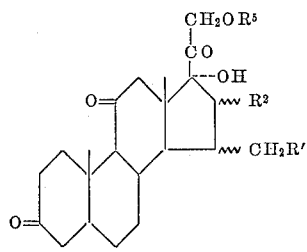

in which R' and R$^2$ may be hydrogen or alkyl, R$^5$ may be hydrogen or lower alkanoyl and the 15 and 16 substituents may be α or β as shown by the wavy lines.

We have found that the introduction of an alkyl group at the 15 position of the pregnane nucleus produces a wide variety of new steroids of great utility.

The 15-alkyl steroids produced in accordance with the present invention possess high anti-inflammatory activity, considerably greater than that of the parent steroids, and are especially effective for the treatment of arthritis and related diseases since they can be administered for their cortisone-like action in low dosage thereby minimizing undesired side effects.

In the preparation of the new anti-inflammatory steroids of our invention, one can start with 3α,17α,21-trihydroxy-pregnane-11,20-diones, either with or without a 16α or β-alkyl group. Likewise, the corresponding 5α-pregnane derivatives are also usable as starting materials and the term pregnane in these specifications and claims are intended to cover these isomeric compounds. When the starting material is 3α,17α,21-trihydroxy-pregnane-3,11,20-dione itself, or the 16α or β-alkyl derivatives thereof, the prime intermediate, the 15-keto compound may be prepared by microbial oxidation. This is described in Flow Sheet I. The 3 and 21-hydroxyls are protected as the 2-tetrahydropyranyl ethers and the microbial oxidation to a hydroxyl, described in U.S. Letters Patent 2,960,434, is then followed. The hydroxyl thus introduced at 15 is oxidized to a keto group followed by removal of the protecting group.

I

*Biological Preparation of 3α,17α,21-Trihydroxypregna-11,15,20-Triones*

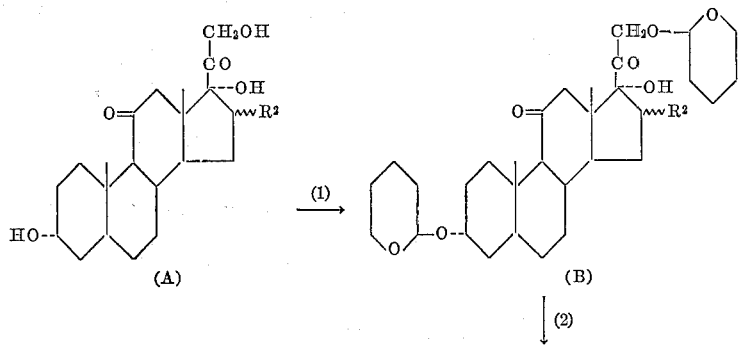

See footnotes at end of table.

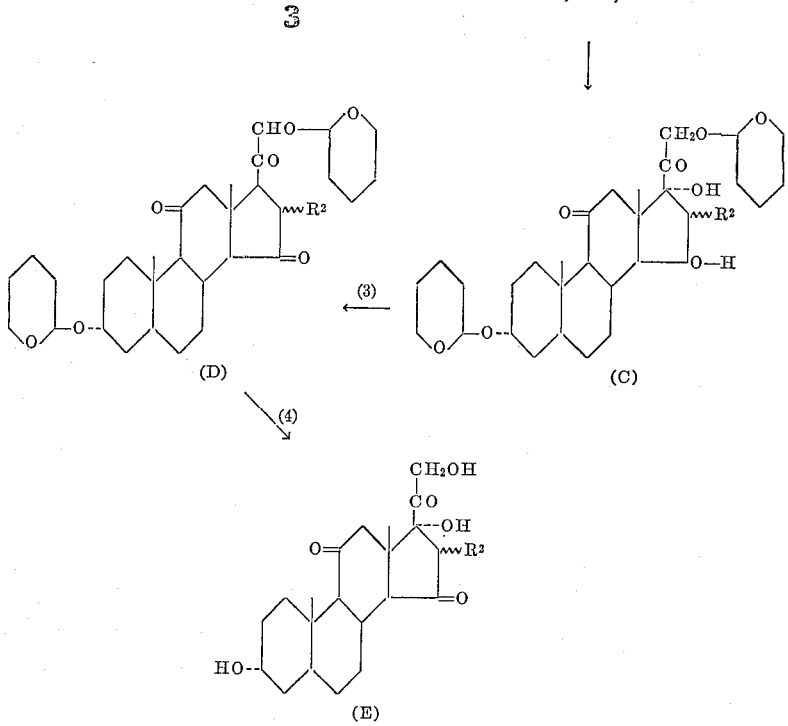

Definitions:
R² = H or alkyl.
Reagents:
(1) 2,3-dihydropyran in ether, HCl catalyst at room temperature (OH et al, J. Am. Chem. Soc., 74, 1239 (1952)).
(2) Microbiological oxidation with an oxidizing strain of *B. megaterium* (NRRL 2471). (Cf. U.S. 2,960,424.)
(3) CrO₃ in pyridine.
(4) HCl in aq. alcohol at reflux.

When the starting material is a 16-alkyl-3α,17α,21-trihydroxy-pregnane-11,20-dione such as the 16α or β-methyl, 16α or β-ethyl, 16α or β-propyl or 16α or β-butyl compounds, the introduction of a 15-keto in order to form the primary intermediate may alternatively be carried out by a series of chemical reactions as described in Flow Sheet II. By a series of known reactions, the 15-bromo-16,17-oxido compound is synthesized in one of two ways as shown in the flow sheet. The 15-bromo is then replaced with an acetoxy group and the oxido ring reopened to reform the 17α-hydroxyl. In so doing, there is formed a 15,16-double bond which is part of an enol acetate structure. Saponification of the acetate radical causes de-enolization to the 15-keto compounds. The acetate is usually preferred, but any other lower alkanoyloxy group is usually usable. The 15-keto-16-alkyl steroids which are thus obtained (compounds S and T in Flow Sheet II) are the 16α and 16β epimers. These may be separated at this point if desired.

II

*Preparation of 3α,17α,21-Trihydroxy-16-Alkylpregna-11,15,20-Triones*

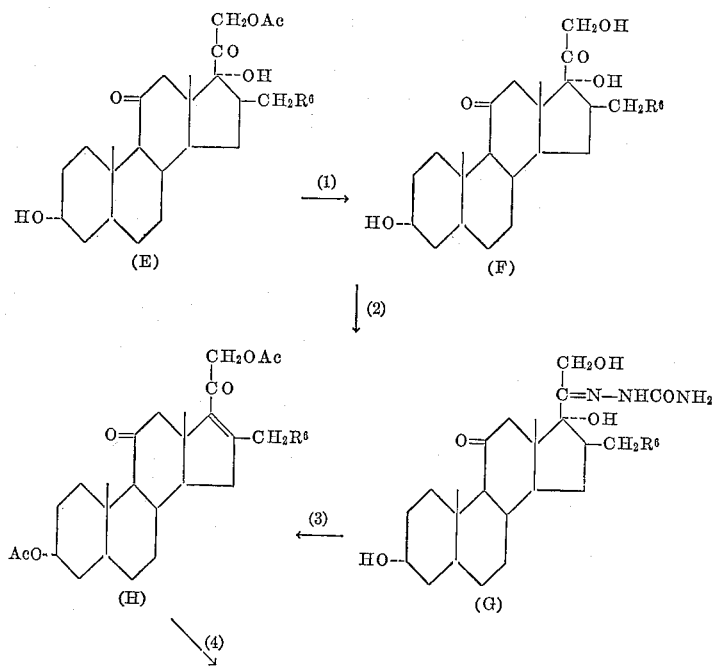

See footnotes at end of table.

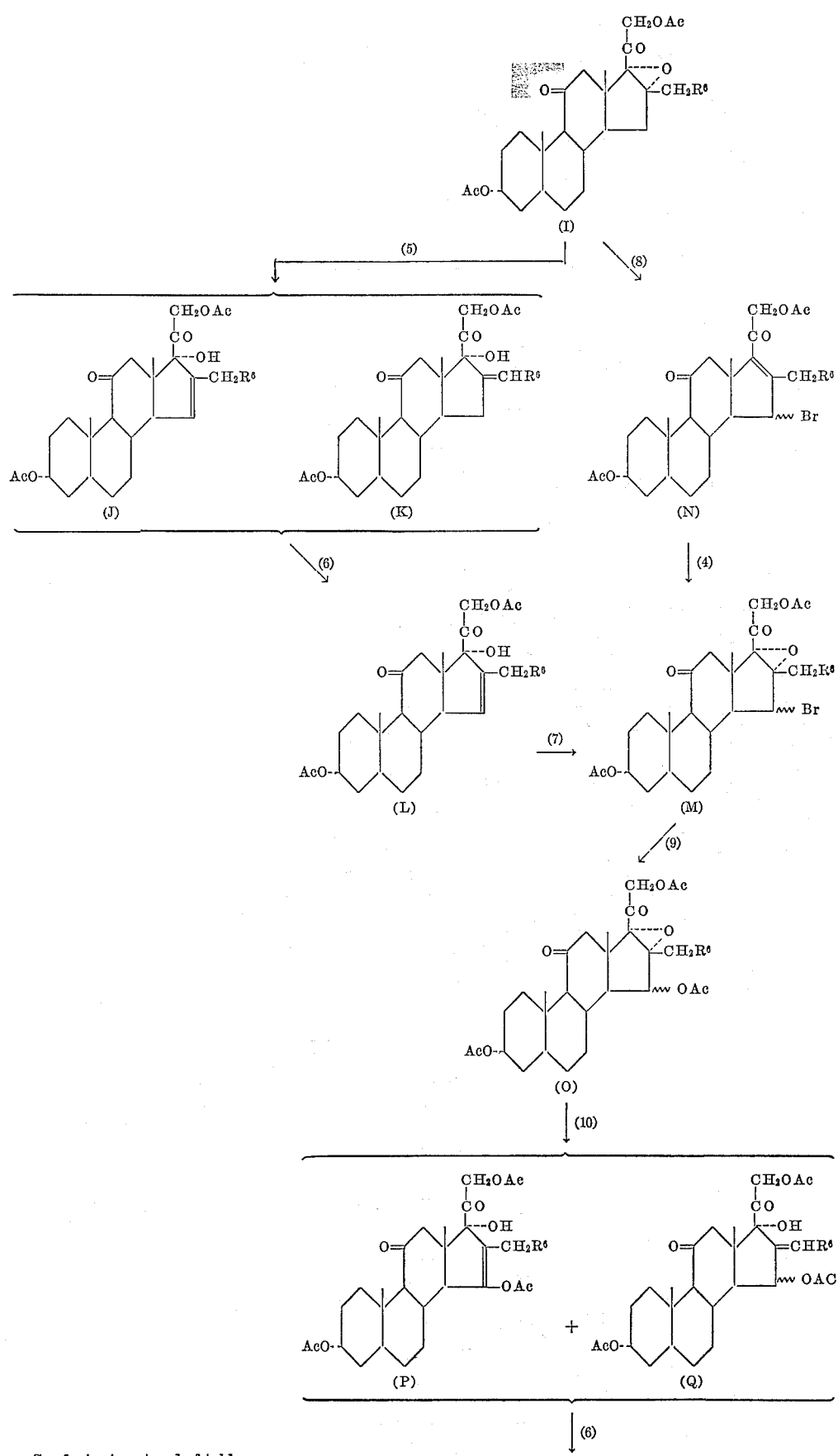
See footnotes at end of table.

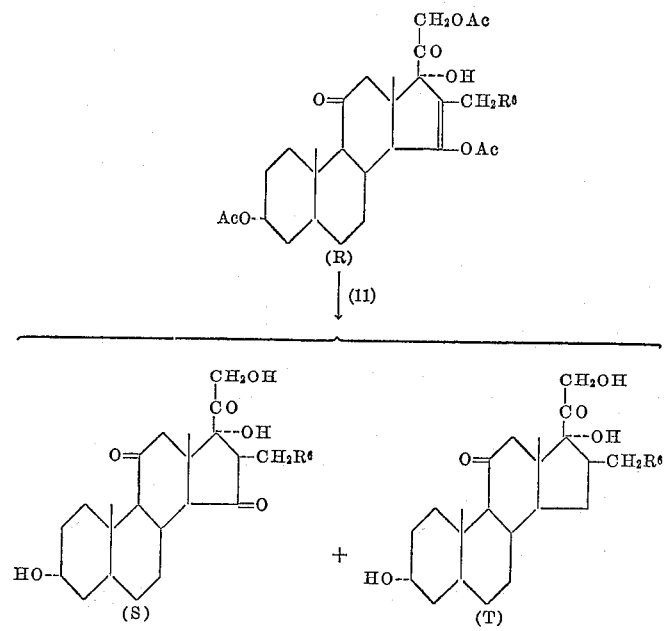

Definitions:
 Ac=acetyl.
 $R^6$=H or alkyl.
 A wavy line shows a mixture of $\alpha$ and $\beta$ substituents.
Reagents:
 (1) Aqueous caustic (KOH, NaOH, $Na_2CO_3$, etc.).
 (2) Semicarbazide hydrochloride and $NaHCO_3$ in aqueous dimethyl formamide.
 (3) Acetic anhydride, acetic acid, heat.
 (4) Peroxide oxidation—alkaline $H_2O_2$ or alkyl hydroperoxide and base followed by reacylation at $C_3$ or an organic peracid such as $CF_3CO_3H$.
 (5) HCl and acetic acid.
 (6) Separation by recrystallization.
 (7) N-bromosuccinimide in t-butanol.
 (8) HBr in acetic acid.
 (9) Potassium acetate (other potassium alkanoates give the equivalent corresponding alkanoyloxy derivative).
 (10) Strong acid (HBr, HCl, HF, $HClO_4$, $CF_3COOH$, etc.).
 (11) Sodium hydroxide in aqueous methanol.

*Note.*—The starting material (Compound E), when $R^2$=H, is reported by Taub et al. (J. Am. Chem. Soc. 82, 4012 (1960)). By using higher diazoalkanes such as diazoethane, diazopropane, diazobutane, etc. in the process reported there, in place of diazomethane, the corresponding 16-higher alkyl starting materials are obtained.

Whether or not there is present a 16-alkyl group, the 15-keto steroid is then converted to a mixture of $15\alpha$ and $15\beta$-alkyl steroids by the chemical reactions shown in Flow Sheet III. These consist of first protecting the $C_{17}$ substituents in the form of a bismethylenedioxy derivative followed by condensation of the 15-keto group with an alkylidene triphenylphosphine to form a 15-alkylidene compound. Catalytic hydrogenation of this gives a mixture of $15\alpha$ and $\beta$-alkyl groups which may be separated by chromatography. Thus, in the absence of 16-alkyl groups, one obtains both 15-epimers, and, when the $\alpha$ and $\beta$ 16-alkyl starting materials are used, the four possible stereo isomers are obtained. In this process, any alkylidene triphenylphosphine is usable such as the ethylidene, propylidene, butylidene, etc. compounds, but, in general, we prefer to use the simplest, namely, methylene triphenylphosphine ether.

III

*Preparation of 15-Alkyl Compounds*

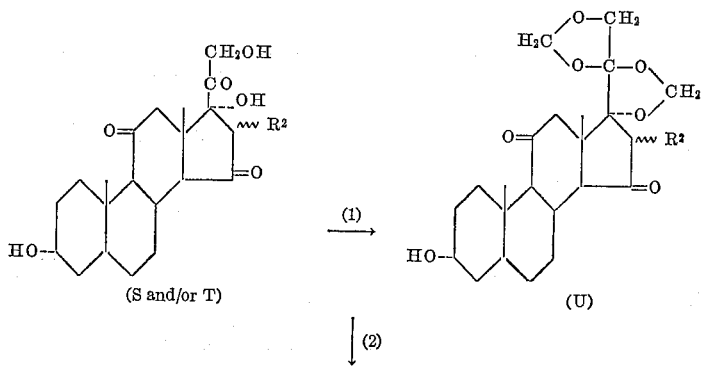

See footnotes at end of table.

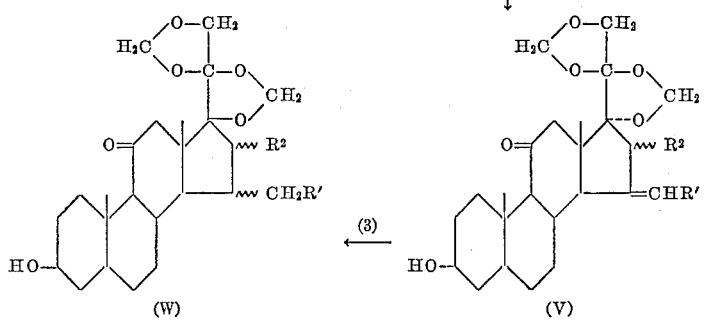

Definitions:
 R'=H or alkyl.
 R²=H or alkyl.
 Wavy lines show either or both α and β-substitution.
Reagents:
 (1) Formaldehyde, HCl, CHCl₃.
 (2) Alkylidene triphenylphosphine.
 (3) Catalytic hydrogenation (e.g., H₂ over Pd).
 Note.—Both the 16 and 15-alkyl groups may be either α or β. The 16-alkyl epimers, when present, are separated earlier. (Cf. Flow Sheet II.) The 15-alkyl epimers of each can be separated at the end of the above sequence by chromatography. Thus, all four possible 15,16-dialkyl compounds or both 15-alkyl compounds are obtained.

These 15-alkyl intermediates are converted by standard methods to anti-inflammatory steroids as described in Flow Sheet IV. The 15-alkyl steroids still have a saturated ring A and a hydroxyl at carbon three. It is, therefore, necessary first, as shown in Part (a) of Flow Sheet IV, to oxidize the 3-hydroxyl to a keto group. This is done before removing the bismethylenedioxy substituent which has been placed on the nucleus to protect the side chain substituents. The 3-keto compound is then treated to remove the bismethylenedioxy group followed by acylation of the 21-hydroxyl with a lower alkanoyl group for protection, to produce compound Y of Flow Sheet IV. It is these compounds which are claimed as intermediates since they are useful for the preparation of other steroids than the anti-inflammatory ones. Unsaturation is now introduced into ring A by bromination and reaction with semicarbazide. Then, by standard known reactions, the $C_{11}$ keto group is reduced to a hydroxyl in order to permit the introduction of other substituents.

IV

*Synthesis of 15-Alkyl Anti-Inflammatory Steroids*

(a) PRIMARY CONVERSION

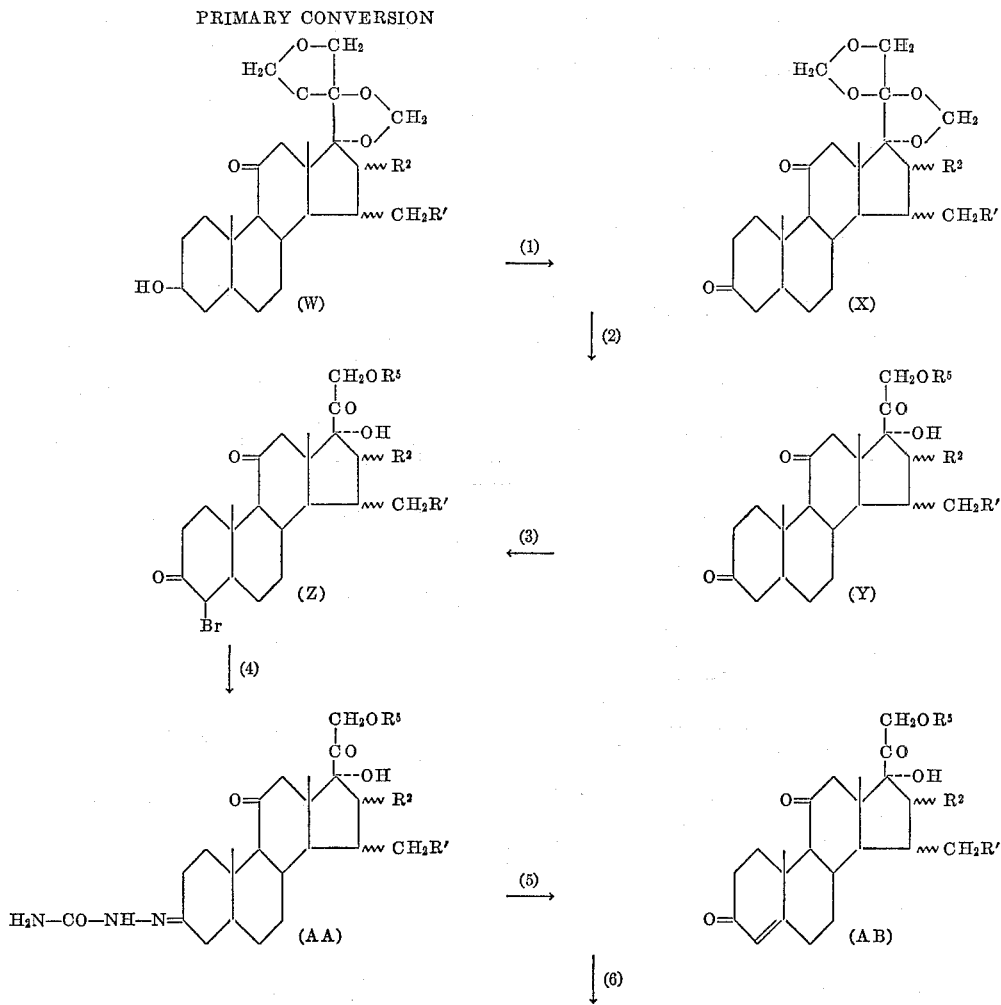

See footnotes at end of table.

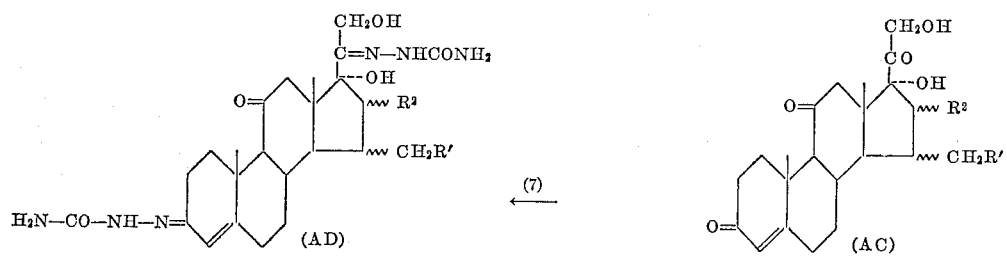
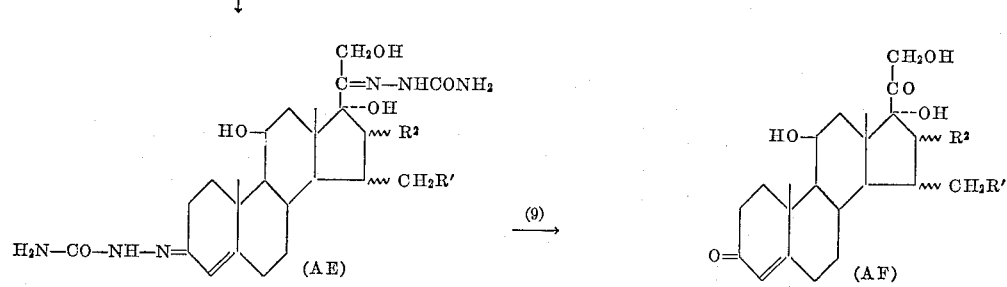
(b) INTRODUCTION OF 2α-ALKYL GROUPS
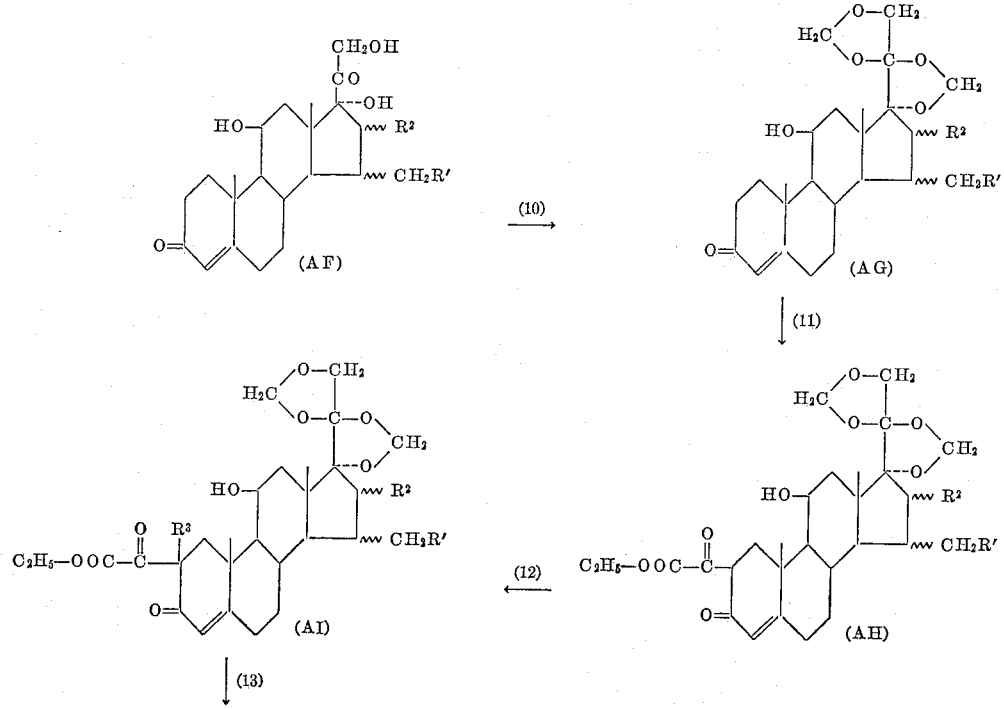
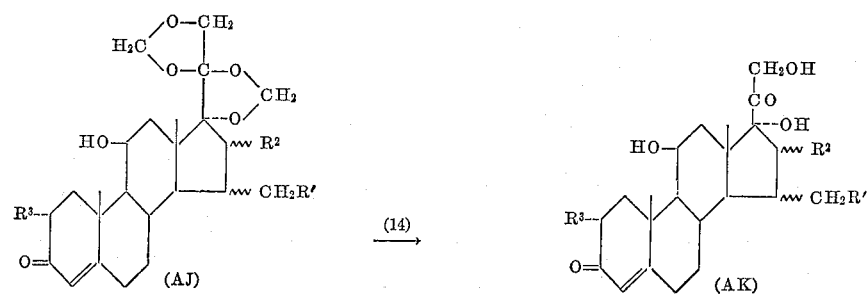
See footnotes at end of table.

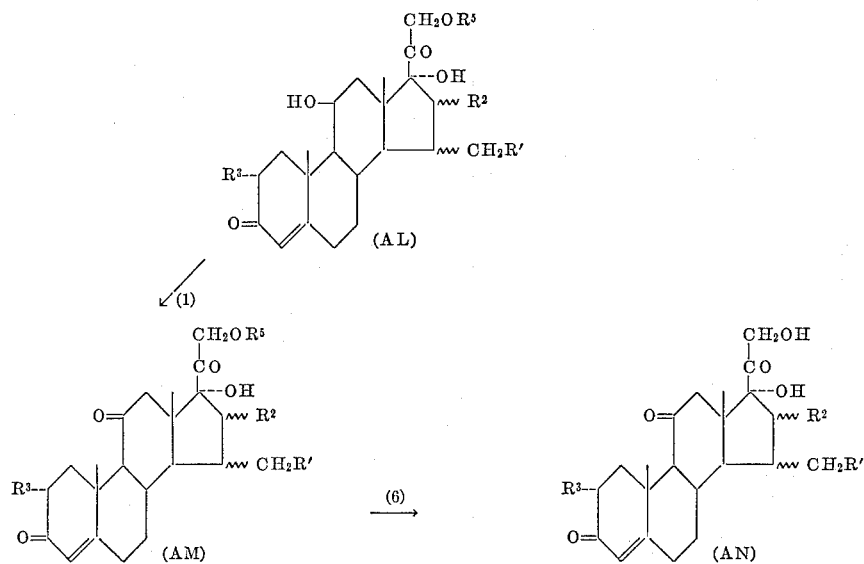
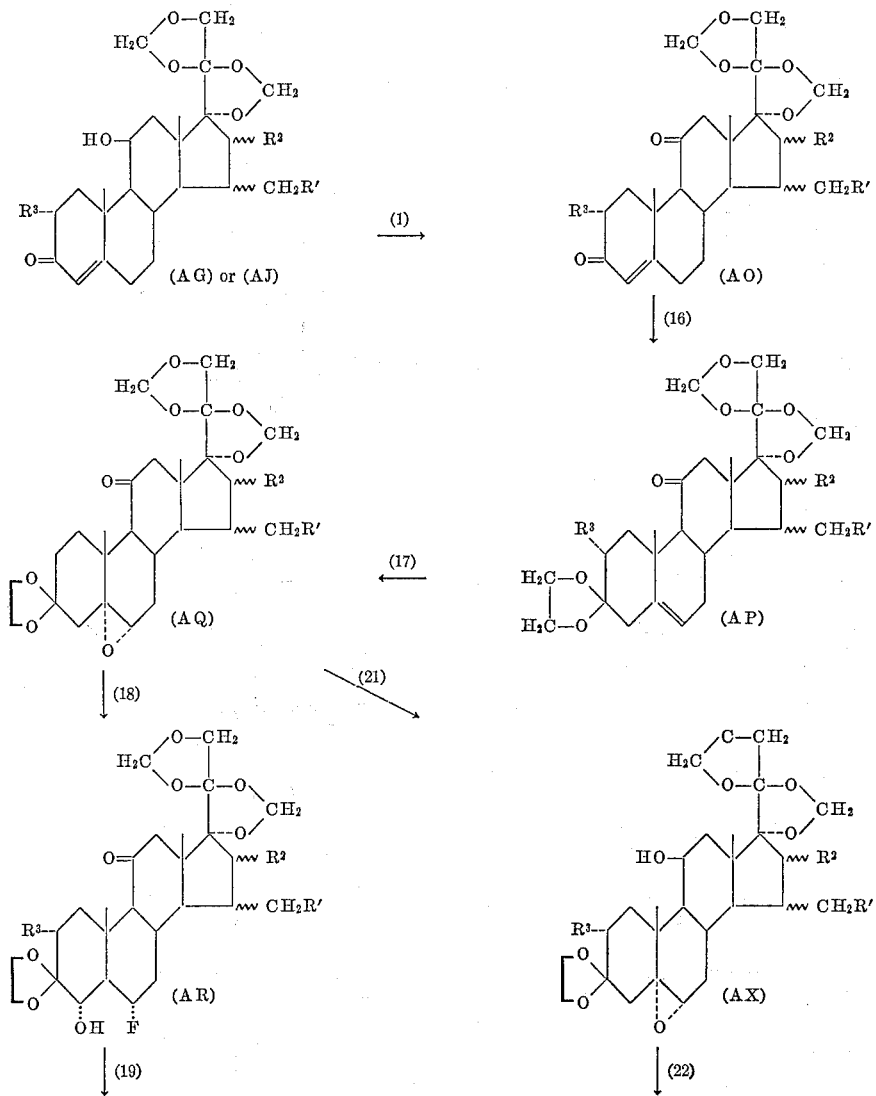
(c) INTRODUCTION OF 6α-ALKYL GROUPS OR HALOGENS
See footnotes at end of table.

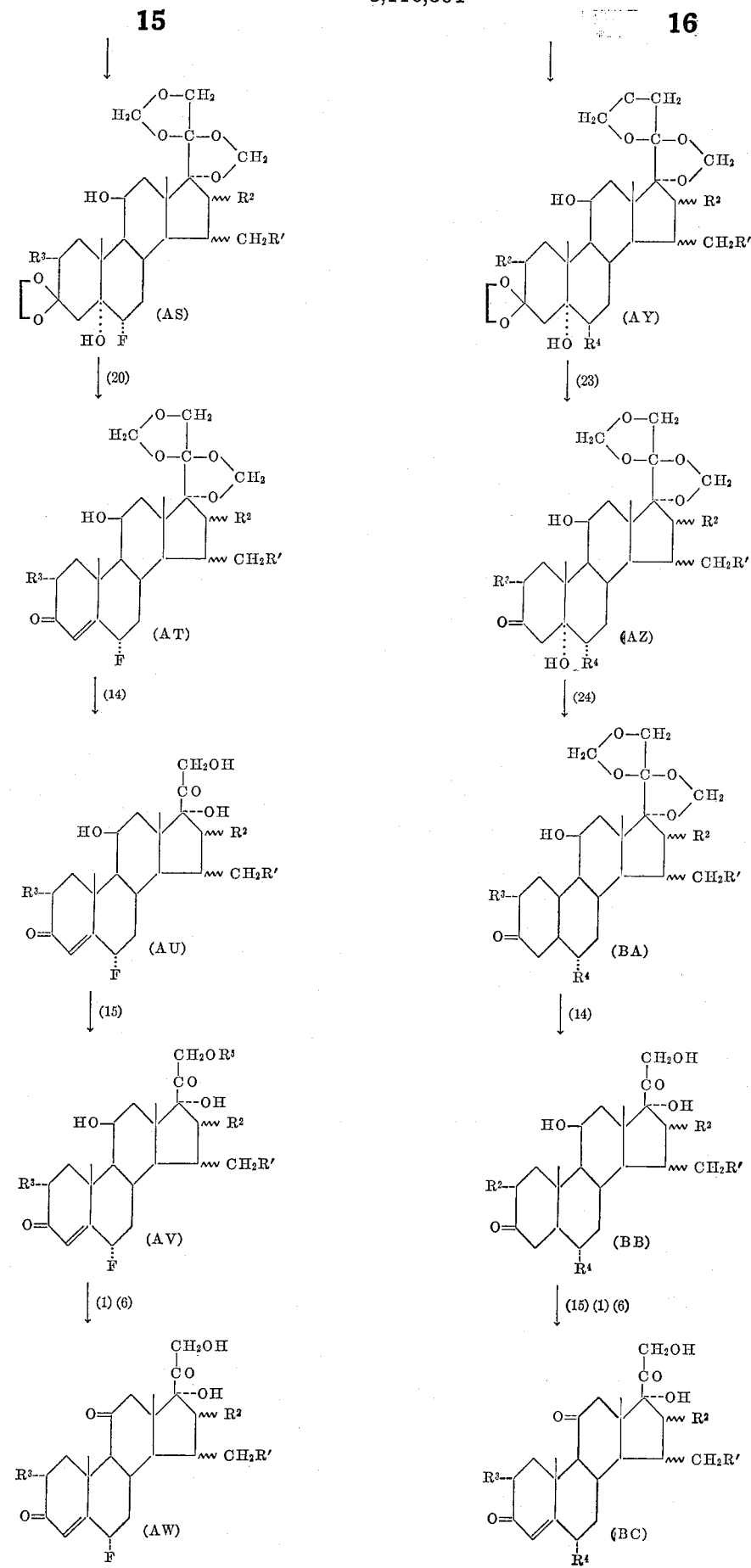
See footnotes at end of table.

(d) FURTHER TRANSFORMATION INTO OTHER ANTI-INFLAMMATORY STEROIDS
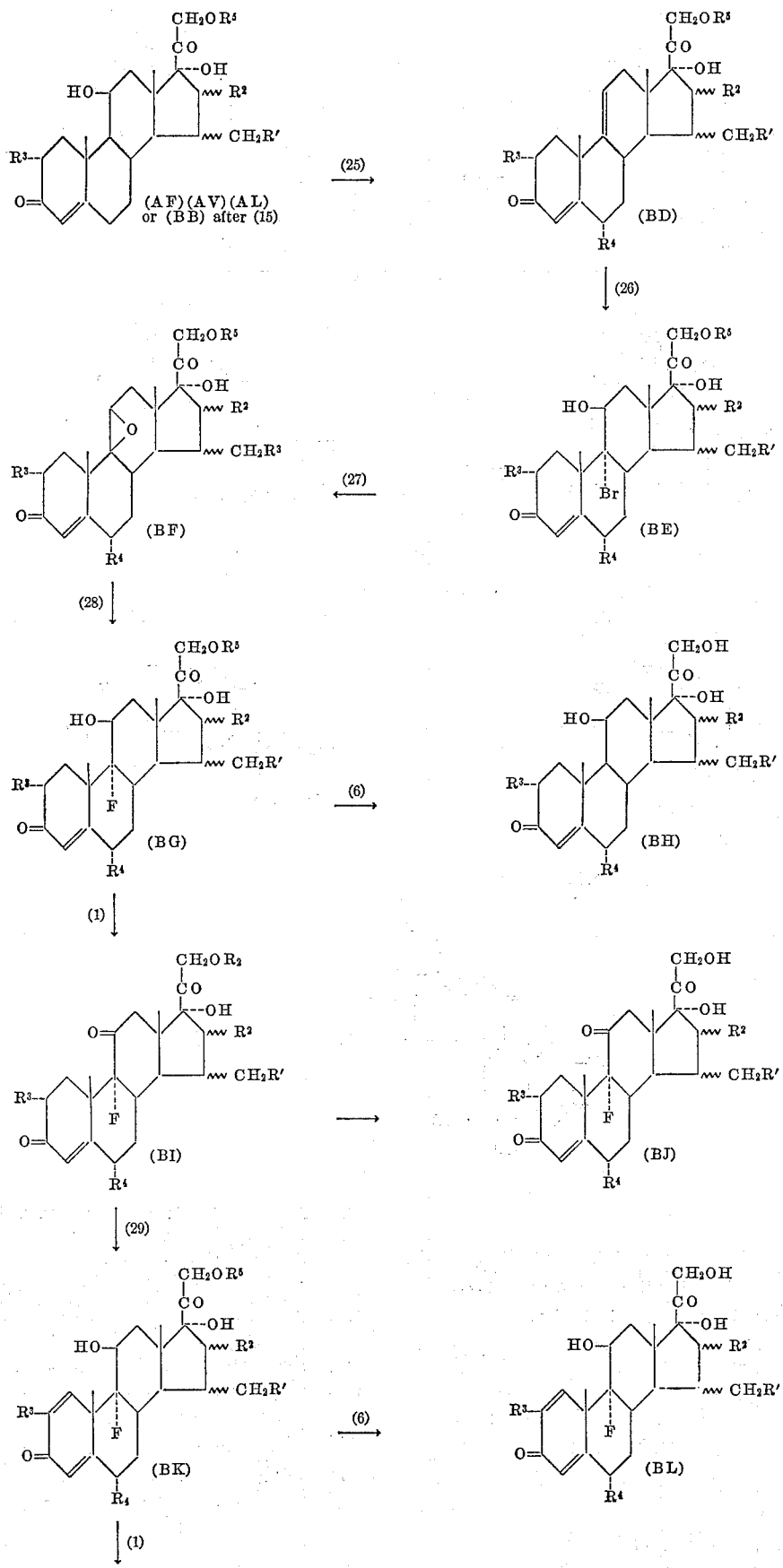
See footnotes at end of table.

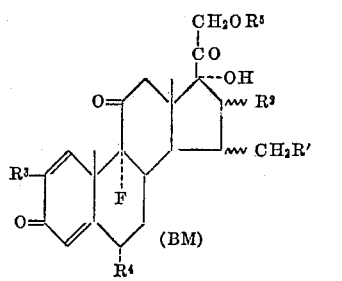

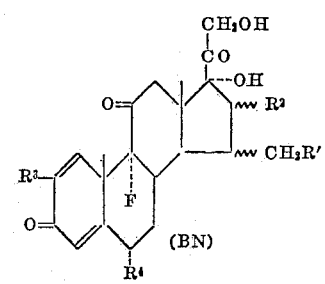

(e) ALTERNATIVE OTHER TRANSFORMATIONS

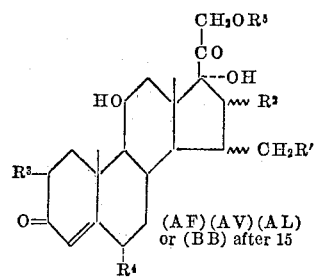

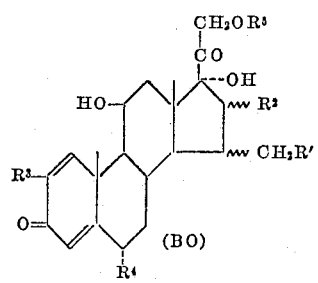

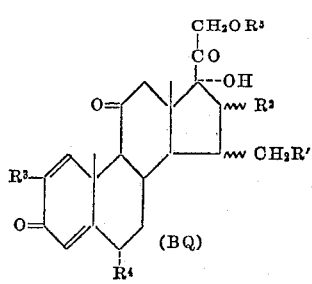

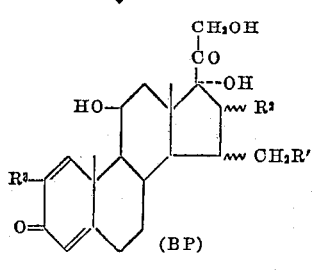

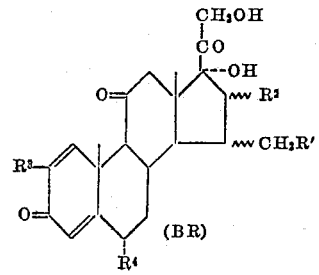

Definitions:
$R^1$ = H or alkyl.
$R^2$ = H or alkyl.
$R^3$ = H or alkyl—(in IV(b) it is used for alkyl only).
$R^4$ = H, halogen, alkyl—in IV(b) it is used for alkyl only).
$R^5$ = lower alkanoyl—(in claims it is used for H or lower alkanoyl).
Wavy lines indicate either α or β substitution.

Reagents:
(1) $CrO_3$ in pyridine at room temperature.
(2) Formic acid and $NaHCO_3$ at 100° followed by $NaOCH_3$ in $CH_3OH$ at room temperature and then by a lower alkanoic anhydride at 100° C. Usually acetic anhydride is used.
(3) $Br_2$ in chloroform on a chloroform-acetic acid solution.
(4) Semicarbazide hydrochloride and $NaHCO_3$ in water.
(5) Acetic acid and pyruvic acid.
(6) $NaHCO_3$ in aqueous methanol.
(7) Semicarbazide hydrochloride and $NaHCO_3$ in aqueous DMF.
(8) Na borohydride in tetrahydrofuran.
(9) Acetic acid and pyruvic acid.
(10) Formaldehyde and HCl in chloroform.
(11) $NaOCH_3$ and diethyl oxalate in 5-butyl alcohol.
(12) An alkyl halide (usually methyl iodide which gives $R^2 = CH_3$) in acetone.
(13) $NaOCH_3$ in absolute alcohol.
(14) Formic acid and $NaHCO_3$ at 100° followed by $NaOCH_3$ in $CH_3OH$ at room temperature.
(15) A lower alkanoic anhydride (usually acetic anhydride which gives $R^5$ = acetyl).
(16) Ethylene glycol and p-toluene sulfonic acid monohydrate at reflux in benzene.
(17) Perbenzoic acid in benzene.
(18) $BF_3$ in ether and benzene.
(19) Sodium borohydride in tetrahydrofuran and water.
(20) p-Toluene sulfonic acid in acetone.
(21) Sodium borohydride in tetrahydrofuran and water followed by $Na_2HPO_4$.
(22) An alkyl magnesium bromide ($R^4MgBr$) (usually $CH_3MgBr$ which gives $R^4 = CH_3$) in ether and benzene.
(23) Sulfuric acid (98%) in methanol at reflux.
(24) KOH in methanol.
(25) $CH_3SO_2Cl$ in dimethylformamide and pyridine.
(26) N-bromosuccinimide in dioxane, plus perchloric acid, at 15° C.
(27) Potassium acetate in absolute alcohol at reflux.
(28) HF in tetrahydrofuran.
(29) $SeO_2$ in t-butanol.

In Part (b) of Flow Sheet IV is shown the introduction of 2α-alkyl groups, which proceeds through a bismethylenedioxy derivative, by acylation at position 2 to form a keto ester, followed by reaction with an alkyl halide. Any alkyl halide such as methyl bromide, ethyl iodide, propyl bromide, butyl bromide and the like, may be used, but methyl halide is preferred since it gives the simplest alkyl derivative.

In Part (c) of Flow Sheet IV is described the introduction of 6α-alkyl or halogen groups. This can be carried out alternatively or successively to the introduction of 2 α-alkyl groups. It is effected again by protection of the 17 substituents as a bismethylenedioxy group followed by protection of the 3-keto groups as an ethylenedioxy group. The latter shifts the $C_4$ double bond into the 5,6 position which is then utilized to form a 5,6-oxide and by a series of reactions, as described in the flow sheet, this is used to introduce either a halogen or an alkyl group. The halogen is introduced by reaction with chlorine, bromine, etc. or $BF_3$, the latter is preferred. An alkyl group is introduced using an alkyl (such as methyl, ethyl, butyl, etc.) magnesium bromide. Methyl magnesium bromide is usually used.

Whether or not 2α-alkyl and/or 6α-alkyl or halogen groups have been introduced, the 15-methyl steroids can be further transformed into other anti-inflammatory steroids by dehydration of the 11-hydroxyl to form a 9,11 double bond and, by standard procedures, the introduction of a 9α-fluoro or other halogen. All of these derivatives can be used in the form of an 11β-hydroxyl or an 11-keto and in the form of a free $C_{21}$ hydroxyl or a $C_{21}$ alkanoyl derivative. Any of these compounds as shown in Parts (d) and (e) of Flow Sheet IV can be converted into a $\Delta_{1,4}$ steroid by oxidation with selenium dioxide and these compounds likewise can be used in the form of 11β-hydroxyl or 11-keto compounds. The details of these various transformations are described in the flow sheet and can be found in the examples.

Among the anti-inflammatory steroids included within our invention can be mentioned:

15-methyl-17α,21-dihydroxy - 4 - pregnene-3,11,20-trione;
15-methyl - 17α,21 - dihydroxy 1,4-pregnadiene-3,11,20-trione;
15-methyl - 9α - fluoro-17α,21-dihydroxy-1,4-pregnadiene-3,11,20-trione;
15,16-dimethyl - 17α,21 - dihydroxy-4-pregnene-3,11,20-trione;
15,16-dimethyl-17α,21-dihydroxy - 1,4 - pregnadiene-3,11,20-trione;
15,16-dimethyl - 9α - fluoro-17α,21-dihydroxy-1,4-pregnadiene-3,11,20-trione;
2,15-dimethyl - 17α,21 - dihydroxy-1,4-pregnadiene-3,11,20-trione;
2,15-dimethyl - 9α - fluoro-17α,21-dihydroxy-1,4-pregnadiene-3,11,20-trione;
6,15-dimethyl - 17α,21 - dihydroxy-1,4-pregnadiene-3,11,20-trione;
6,15-dimethyl - 9α - fluoro-17α,21-dihydroxy-1,4-pregnadiene-3,11,20-trione;
2,15,16-trimethyl 17α,21 - dihydroxy-1,4-pregnadiene-3,11,20-trione;
2,15,16-trimethyl - 9α - fluoro-17α,21-dihydroxy-1,4-pregnadiene-3,11,20-trione;
2,6,15,16-tetramethyl - 17α,21 - dihydroxy-1,4-pregnadiene-3,11,20-trione;
2,6,15,16-tetramethyl - 9α - fluoro-17α,21-dihydroxy-1,4-pregnadiene-3,11,20-trione and the corresponding 5α or allopregnane compounds.

Among the intermediates of the two classes claimed as part of our invention can be mentioned:

16α-methyl-3α,17α,21-trihydroxypregna-11,15,20-trione;
16β-methyl-3α,17α,21-trihydroxypregna-11,15,20-trione;
15α-methyl-17α,21-dihydroxypregna-3,11,20-trione;
15,16β-dimethyl-17α,21-dihydroxypregna-3,11,20-trione;
15β-methyl-17α,21-dihydroxypregna-3,11,20-trione;
15β,16α-dimethyl-17α,21-dihydroxypregna-3,11,20-trione;
15β,16β-dimethyl-17α,21-dihydroxypregna-3,11,20-dione;
and the corresponding 5α or allo-pregnane compounds.

Although the flow sheets show the preparation of 15-alkyl-21-hydroxypregnane derivatives, the same transformations can be carried out on pregnane derivatives lacking the 21-hydroxyl or even the 17α-hydroxyl. In the latter case the products will be 15-alkyl progesterone derivatives, e.g.

The 15-alkyl steroids, which possess extremely high anti-inflammatory activity, may be administered orally, parenterally or topcially. Thus, the active ingredient can be administered alone or may be associated with a carrier. A smaller quantity of the active 15-alkyl steroid may be administered to the patient and have the same therapeutic effect as larger quantities of other steroids such as cortisone or hydrocortisone. Any of the carriers used in pharmaceutical practice may be employed where there is no incompatibility with the active materials. The composition may take the form of tablets, powders, capsules, elixirs, syrups or other dosage forms which are particularly useful for oral ingestion. Liquid diluents are employed in sterile condition for parenteral use, namely, by injection. Such a medium may be a sterile solvent for the active material. For topical administration any of the known dermatologic vehicles may be employed. Such vehicles for external application include water-soluble ointment bases, oils, petrolatum and jellies.

Our invention can be illustrated by the following examples:

EXAMPLE 1

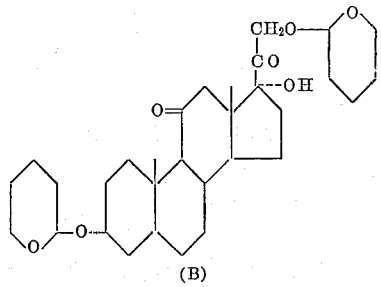
(B)

To a solution of 1.1 g. of 3α,17α,21-trihydroxypregnane-11,20-dione in 10 cc. of anhydrous, peroxide-free diethyl ether is added 2.0 g. of 2,3-dihydropyran (freshly distilled from NaOH pellets) followed by one drop of concentrated hydrochloric acid. The mixture is allowed to stand several days. The ether is removed by distillation and the residue is dried in vacuo. The residue is used in further reactions as is.

EXAMPLE 2

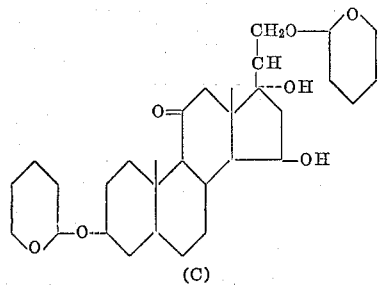
(C)

Approximately 3.2 liters of a culture medium having the composition 50 g. of commercial dextrose (cerelose), 20 g. of commercial lactalbumin digest (Edamine), 5 g. of cornsteep liquir distilled water to 1 l. volume, pH adjusted to 6.5 with NaOH is sterilized for 30 minutes at 100° C. The medium is then inoculated with approximately 125 ml. of a growth of a strain of B. megaterium NRRL B938. The mixture is then agitated using a two turbo agitator at 408 r.p.m. and air is passed in at a rate of two liters per minute for approximately 24 hours while maintaining the temperature at 28° C. At the end of the 24-hour period approximately 0.8 g. of the product of Example 1 dissolved in 100 ml. of propylene glycol is added to the fermented medium and agitation and aeration continued at the same rate. The resulting broth is filtered and the cells reserved for further treatment, is extracted with three 1.5 liter portions of n-propyl acetate. The combined extracts are washed with one liter of 3% sodium bicarbonate and one liter of water and concentrated to dryness in vacuo (broth extract).

The broth extract containing the 15-hydroxy derivative of the product of Example 1 is chromatographed on silica gel. The five 100 ml. fractions which were eluted with 2% methanol in chloroform were evaporated to dryness leaving as a residue a crude material containing the product. This material is dissolved in ethyl acetate and subjected to paper strip chromatography in the system benzene/formamide. The major component, with an $Rf=0.58$ is eluted from the paper with methanol. The methanol solution is evaporated and the partially purified product which remains is partioned between water and chloroform. The chloroform phase which contains the product is separated and dried over sodium sulfate. The chloroform solution is filtered to remove the sodium sulfate and the filtrate containing the product evaporated to remove the chloroform and leave the partially purified product as a solid residue. This partially purified product is crystallized from ethyl acetate.

EXAMPLE 3

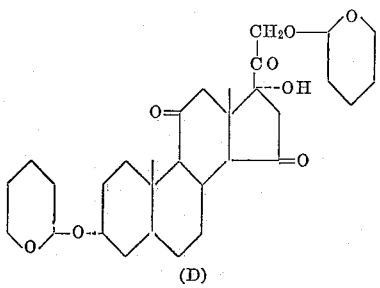

(D)

A solution of 400 mg. of the 15-hydroxy compound produced in Example 2 in 4 ml. of pyridine is added to the complex formed by the addition of 400 mg. of chromium trioxide. The mixture is swirled until thoroughly mixed and then allowed to stand at room temperature overnight. The reaction mixture is poured into water and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated in vacuo and the residual crystalline material is purified by crystallization to give the 3,21-bis(2′-tetrahydropyranyl) ether of 3α,17α,21-trihydroxypregnane-11,15,20-trione.

EXAMPLE 4

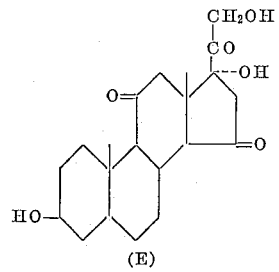

(E)

To a solution of 1.2 g. of the 3,21-bis(2′-tetrahydropyranyl)ether produced in Example 3 in 75 cc. of alcohol is added 4 cc. of water and 1.0 cc. of concentrated hydrochloric acid. The mixture is kept at 20° for several hours and then cooled to 0° C. overnight. The product is filtered, washed with cold alcohol and dried. Evaporation of the mother liquor yields further crops of the product, 3α,17α,21 - trihydroxypregnane - 11,15,20-trione.

When 16α or 16β-methyl-3α,17α,21-trihydroxy-11,20-dione is used in the procedure of Example 1 and the product is successively used in the procedures of Examples 2, 3 and 4, there is similarly obtained 16α or β-methyl-3α,17α,21-trihydroxypregnane-11,15,20-trione.

EXAMPLE 5

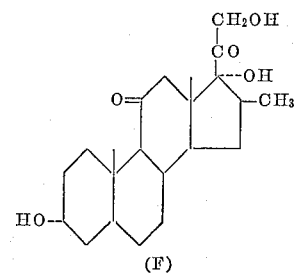

(F)

Fifty milligrams of 16β-methyl-3α,17α,21-trihydroxypregnane-11,20-dione-21-acetate (Taub et al., J. Am. Chem. Soc., 82, 4012 (1960)) is dissolved in a mixture of 1.0 cc. of benzene and 1.0 cc. of 1 N methanolic potassium hydroxide. The solution is allowed to stand for a period of about ten minutes at room temperature. It is then acidified with acetic acid. The benzene is evaporated in vacuo and the residual material is crystallized from ethyl acetate and ether to give 16β-methyl-3α,17α,21-trihydroxypregnane-11,20-dione.

Similarly, when the corresponding 16β-ethyl, 16β-propyl or 16β-butyl-3α,17α,21-trihydroxypregnane-11,20-dione-21-acetate (prepared by the method of Taub et al. using diazoethane, diazopropane or diazobutane in place of diazomethane) is substituted for the 16β-methyl compound in the above procedure, the corresponding 16-alkyl products are obtained.

EXAMPLE 6

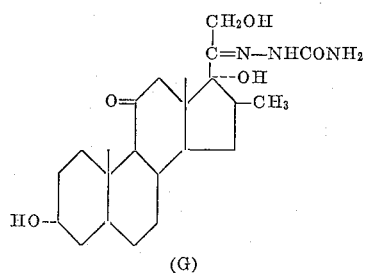

(G)

To a stirred solution of 500 mg. of 16β-methyl-3α,17α,21-trihydroxypregnane-11,20-dione in 12.5 ml. of methanol and 3 ml. of dimethylformamide under nitrogen is added a slurry of 680 mg. of semicarbazide hydrochloride and 370 mg. of sodium bicarbonate in 1 ml. of water. The stirred mixture is refluxed three and one-half hours and maintained at 45° C. for 17 hours. It is then cooled to 20° C. and 50 ml. of 50% saturated aqueous sodium chloride is added and after two hours at 0° C. the precipitate of the 20-semicarbazone of 16β-methyl-3α,17α,21-trihydroxypregnane-11,20-dione is filtered, washed with water until free of chloride ion and dried in air. The corresponding 16-higher alkyl compounds are obtained when the other products of Example 5 are substituted in the above procedure for the 16β-methyl compound used above.

EXAMPLE 7

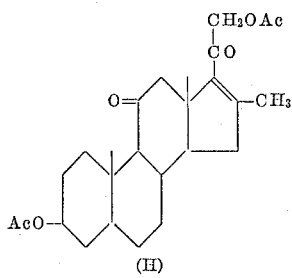

(H)

A solution of 500 mg. of the 20-semicarbazone of 16β-methyl - 3α,17α,21 - trihydroxypregnane-11,20-dione in 10 ml. of acetic acid and 0.5 ml. of acetic anhydride is heated at reflux in an atmosphere of nitrogen for one hour. The reaction mixture is cooled and 13 ml. of water is added. The mixture is heated on a steam bath for 5 hours and the mixture is then concentrated nearly to dryness in vacuo. Water and chloroform are added. The mixture is thoroughly extracted with chloroform and the combined chloroform extracts are washed with excess saturated aqueous sodium bicarbonate and dried over anhydrous sodium sulfate. The solvent is then removed by distillation in vacuo. The residue is chromatographed on neutral alumina from which the pertinent benzene-chloroform eluates yield 16-methyl-3α,21-dihydroxy-16-pregnene-11,20-diol-3,21-diacetate.

The corresponding 16-ethyl, propyl and butyl compounds are obtained when the higher alkyl products of Example 6 are used as the starting material in the above procedure.

EXAMPLE 8

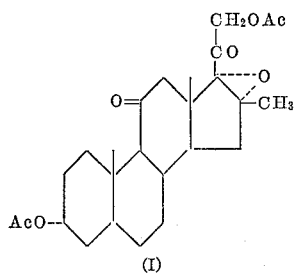

(I)

To a stirred solution of 500 mg. of 3α,21-dihydroxy-16-methyl-16-pregnene-11,20-dione - 3,21 - diacetate in 15 ml. of methylene chloride at 0° C. are added 8 g. of disodium hydrogen phosphate and 2 ml. of 2 M peroxytrifluoracetic acid in methylene chloride. After 10 minutes at 0° C. and 25° for one hour, water is added and the mixture thoroughly extracted with methylene chloride.

The latter extract is washed with saturated aqueous sodium chloride and dried over magnesium sulfate. Evaporation of the solvent and crystallization of the residue from acetone-ether gives 3α,21-dihydroxy-16β-methyl-16α,17α-oxido-pregnane-11,20-dione-3,21-diacetate.

The corresponding 16-ethyl, propyl and butyl compounds are obtained when the higher alkyl products of Example 7 are used in the above procedures as the starting material.

EAXAMPLE 9

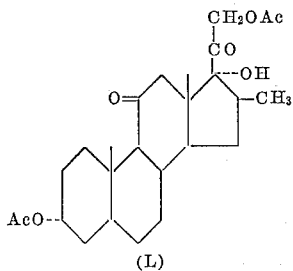

(L)

To a stirred solution of 800 mg. of 16-methyl-16α,17α-oxide (product of Example 8) in 10 ml. of glacial acetic acid at 15° C. is added 10 ml. of 7% hydrogen chloride in acetic acid at 15°. (Alternatively, similar results are obtained with 800 mg. of 16-methyl-16α,17α-oxide in 5 ml. of acetone and 1 ml. of concentrated hydrochloric acid cooled to 10–15°). In either case after 20 minutes at 10–15° water is added and the solid product is filtered, washed with water and dried in air to give a mixture of the corresponding $\Delta^{15}$-16-methyl and 16-methylene steroids. This mixture is separated into its components by chromatography on Whatman #3 filter paper (40 mg. per 6" x 20" sheet) utilizing formamide as the stationary phase and chloroform benzene 1:9 as the mobile phase. The appropriate band as indicated by blue tetrazolium reagent is cut out, eluted with methanol, and the methanol concentrated to dryness in vacuum. Water is added to the residue, the solid filtered, washed with water and dried in air. Pure crystalline material is obtained in each case by crystallization from ethyl acetate-hexane or acetone-ether. The product obtained from 3α,21-dihydroxy-16β-methyl-16α,17α-oxidopregnane - 11,20 - dione-3,21-diacetate is a mixture of 3α,17α,21-trihydroxy-16-methyl-15-pregnene-11,20-dione-3,21-diacetate, and 3α,17α,21-trihydroxy-16-methylene-pregnane - 11,20 - dione-3,21-diacetate which is separated as described above. Similarly, when the 16-ethyl, propyl or butyl compounds of Example 8 are used instead of the 16-methyl compounds in the above procedure, similar mixtures of compounds having the corresponding 16-higher alkyl group are obtained.

EXAMPLE 10

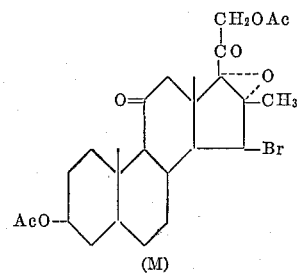

(M)

To a stirred solution of 1.00 g. of 3α,21-diacetoxy-16-methyl-15-pregnene-17α-ol-11,20-dione in 50 ml. of t-butanol and 6 ml. of water is added 1.00 g. of N-brom-succinimide. After five hours at 25° aqueous sodium sulfite is added until the solution is colorless. The t-butanol is removed in vacuo, water (50 ml.) is added and the crystalline reaction product, 3α,21-diacetoxy-15β-bromo-16α,17α-oxido-16β-methyl-pregnane-11,20-dione is filtered, washed with water and dried in air. The corresponding 16-ethyl, propyl and butyl compounds are obtained by using the higher alkyl products of Example 9 in the above procedure instead of the methyl compound.

EXAMPLE 11

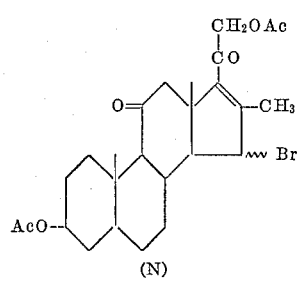

(N)

To a stirred solution of 5.05 g. of 3α,21-dihydroxy-16β-methyl - 16α,17α - oxido - pregnane - 11,20 - dione - 3,21-diacetate in 75 ml. of acetic acid maintained at 10–15° C., there is added 25 ml. of cold 15% hydrogen bromide in acetic acid. After 35 minutes, the mixture is concentrated to dryness in vacuo and the residue is chromatographed on 200 g. of neutral alumina. From the petroleum ether-benzene eluates, there is obtained 16-methyl - 3α,21 -dihydroxy - 16 - pregnene - 11,20 - dione-3,21-diacetate, crystallized from acetone-ether.

The corresponding 16-ethyl, propyl, or butyl compound is readily obtained by using the higher alkyl products of Example 8 in place of the methyl compound in the above procedure.

EXAMPLE 12

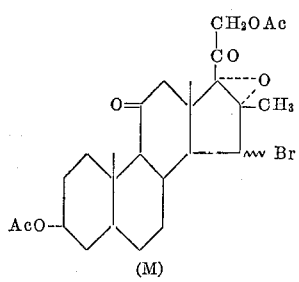

(M)

The procedure of Example 8 is followed using as the starting material the 15-bromo-16-methyl-31α,21-dihydroxy-16-pregnene-11,20-dione-3,21-diacetate produced in Example 11 to yield the same compound as was obtained in Example 10. The corresponding 16-higher alkyl compounds are similarly obtained by starting with the 16-higher alkyl products of Example 11.

EXAMPLE 13

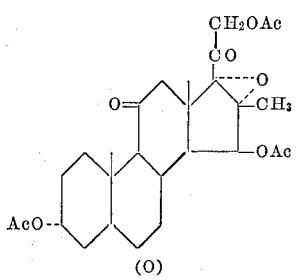

(O)

A mixture of 1.00 g. of the 15-bromo product of Example 12, 1.5 g. of potassium acetate, 1 g. of potassium iodide and 20 ml. of acetone is refluxed and stirred for 16 hours. The mixture is cooled, the inorganic salts removed by filtration and washed with acetone. The combined washes and filtrate are concentrated to dryness under vacuum and water (30 ml.) added to the residue. The crystalline slurry of 3α,15,21-triacetate is cooled to 0° and filtered, washed with water and dried in air.

The corresponding 16-ethyl, propyl and butyl products are obtained by using in the above procedure the 16-higher alkyl products of Example 12 in place of the methyl compound.

EXAMPLE 14

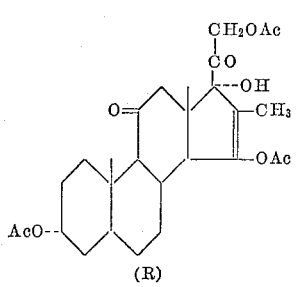

(R)

A solution of 1.00 g. of the triacetoxy oxido-pregnane product of Example 13 in 10 ml. of acetic acid containing 5% hydrogen chloride is kept at 25° for two hours. The solution is concentrated to dryness under vacuum to give a residue consisting primarily of 3α,15,21-triacetoxy-17α-hydroxy-16-methyl-15-pregnene-11,20-dione. The corresponding 16-ethyl, propyl and butyl compounds are similarly prepared from the higher alkyl derivatives.

EXAMPLE 15

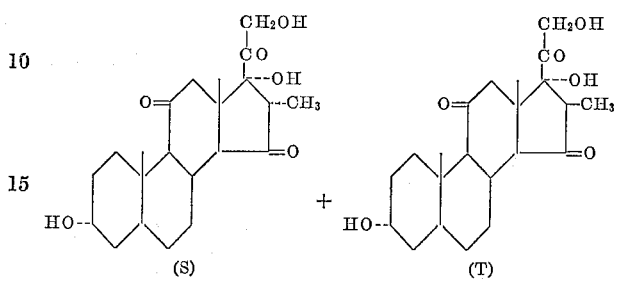

(S)    (T)

To a solution of the product of Example 14 (800 mg.) in 200 ml. of methanol is added 500 mg. of sodium hydroxide in 10 ml. of water. After two hours at 25° the solution is neutralized with acetic acid, the methanol removed under vacuum and the mixture extracted with chloroform. The chloroform extract is washed with saturated aqueous sodium chloride, dried over magnesium sulfate and concentrated to dryness under a vacuum. The residue which consists of a mixture of 16α and 16β-methyl pregnanes is separated into its components by chromatography on Whatman #3 filter paper, utilizing formamide as the stationary and chloroform as the mobile phase. Similar mixtures of 16α and β-ethyl, propyl and butyl products are similarly prepared, using the proper 16-alkyl starting material in the above procedure.

EXAMPLE 16

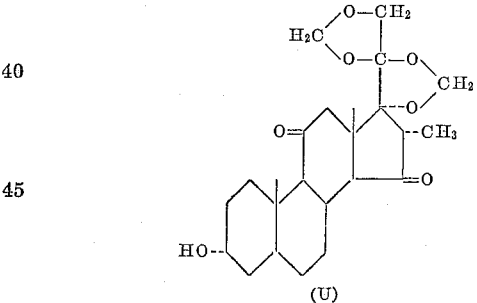

(U)

Twenty-four grams of 16α-methyl-3,17α,21-trihydroxypregnane-11,15,20-trione, 910 ml. of chloroform, 237 ml. of concentrated hydrochloric acid and 237 ml. of 37% formaldehyde are combined and stirred at room temperature for 70 hours. The chloroform layer is separated and the aqueous layer is extracted twice with 50 ml. of chloroform. The combined chloroform solutions are then washed twice successively with 200 ml. of water, 200 ml. of saturated sodium bicarbonate solution and 200 ml. of water. The chloroform solution is dried over magnesium sulfate and concentrated in vacuo to give crystals. These are flushed with 100 ml. of methanol to remove all the chloroform and then sufficient methanol to dissolve the crystals is added. The methanol solution is concentrated in vacuo to a thick slurry and cooled to 0–5°. The mixture is then filtered, and the precipitate is washed twice with 15 ml. of cold methanol and dried in vacuo at 50°. The product can be recrystallized from methanol. It is the 17,21-bismethylenedioxy derivative of 16α-methyl-3α-17α,21-trihydroxypregnane-11,15,20-trione (Compound U).

The corresponding 16β-methyl and 16α and β-ethyl, propyl and butyl compounds are similarly prepared by using the corresponding 16-substituted compounds from Example 15 in the above procedure.

EXAMPLE 17

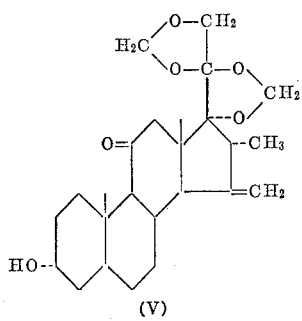

(V)

Butyl lithium (10 ml. of a 1 N ether solution) is added to a stirred suspension of 3.6 g. of methyl triphenylphosphonium bromide [prepared from methyl bromide and triphenylphosphine—see G. Wittig and U. Schollkopf, Chem. Ber. 87, 1318 (1954)] in 50 ml. of ether under nitrogen. The mixture is stirred two hours, following which 1.00 g. of the bismethylenedioxy derivative of $3\alpha,17\alpha,21$-trihydroxy-$16\alpha$-methylpregnane - 11,15,20 - trione in 100 ml. of ether is added. The mixture is stirred 18 hours, water is added and then extracted with chloroform. The chloroform extract is washed with dilute hydrochloric acid, water and dried over magnesium sulfate. The solvent is removed under vacuum and the residue crystallized from acetone-ether.

The $16\beta$-methyl-15-methylene compound is obtained similarly, as are the $16\alpha$ and $\beta$-ethyl, propyl or butyl-15-methylene compounds by using the proper 16-alkyl compound from Example 16 in the above procedure.

When ethyl, propyl or butyl triphenylphosphonium bromide is substituted for the methyl compound in the above procedure, using any of the 16-alkyl products of Example 16 or the 15-keto steroid of Example 4 as the starting material, the corresponding 15-alkylidenyl compound is produced.

EXAMPLE 18

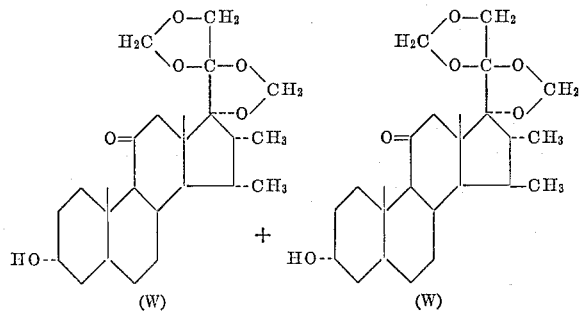

(W) + (W)

A solution of 500 mg. of the $16\alpha$-methyl-15-methylene product of the previous example is hydrogenated over 100 mg. of 5% palladium on charcoal catalyst in 15 ml. of ethyl acetate. Following uptake of 1 equivalent of hydrogen the catalyst is filtered, washed with ethyl acetate and the filtrate and washings concentrated to dryness. The residue is a mixture of $15\alpha,16\alpha$ and $15\beta,16\alpha$-dimethyl-pregnanes which is separated into its components by chromatography in Whatman #3 filter paper using formamide as the stationary and 1:1 benzene-cyclohexane as the mobile phase.

Similar reduction of the $16\beta$-methyl-15-methylenebismethylenedioxy prepared as described in Example 17, gives the corresponding $15\alpha,16\beta$-dimethyl and $15\beta,16\beta$-dimethyl-bis-methylene dioxy derivatives. When the other 15-alkylidenyl-16-alkyl steroids and 15-alkylidenyl steroids of Example 17 are similarly treated by the above procedure, the corresponding 15,16-dialkyl-bismethylenedioxy steroids are obtained.

EXAMPLE 19

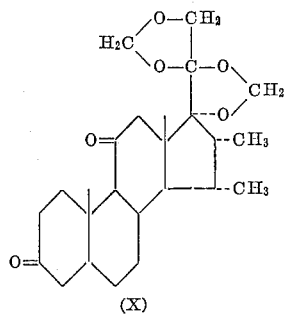

(X)

A solution of 400 mg. of the 17,21-bismethylenedioxy derivative of $15\alpha,16\alpha$-dimethyl-$3\alpha,17\alpha,21$-trihydroxypregnane-11,20-dione in 4 ml. of pyridine is added to the complex formed by the addition of 400 ml. of chromium trioxide to 4 ml. of pyridine. The mixture is swirled until thoroughly mixed and allowed to stand at room temperature overnight. The reaction mixture is then poured into water and the aqueous mixture is extracted with ether and then twice with ethyl acetate. The combined ether and ethyl acetate extracts are washed with dilute aqueous sulfuric acid at about 0° C., and then with water until neutral. The solvent layer is then dried and the solvents are removed by vacuum evaporation. The residual crystalline material is purified by crystallization from ethyl acetate-ether to give the 17,21-bismethylenedioxy derivative of $15\alpha,16\alpha$-dimethyl-$17\alpha,21$-dihydroxypregnane-3,11,20-dione.

When the other 15-alkyl and 15,16-dialkyl steroids of Example 18 are substituted for the $15\alpha,16\alpha$-dimethyl steroid in the above procedure, the corresponding 3-keto product is obtained.

EXAMPLE 20

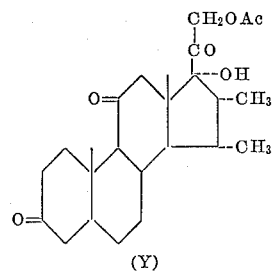

(Y)

A slurry of 970 mg. of the product of Example 19 in 97 ml. of 60% formic acid is six times purged with nitrogen and then heated on a steam cone for 15 minutes under nitrogen. After about five minutes, the compound is completely in solution. It is cooled in an ice bath and 100 ml. of water is added. There is then added gradually 20 g. of sodium carbonate over approximately 20 minutes. This results in a gummy precipitate which is extracted with chloroform. The chloroform solution is washed acid-free with saturated sodium bicarbonate and then with water. The chloroform is removed in vacuo and the residue is flushed with 20 ml. of methanol and then concentrated in vacuo to dryness.

The crude product is dissolved in 45 ml. of purified methanol and purged six times with nitrogen. After adding 1.43 ml. of 0.21 M sodium methoxide in methanol, the solution is stirred for seven minutes at 20–25° under nitrogen. It is then acidified with 3–4 drops of acetic acid, 5 ml. of water and 500 mg. of Darco G–60 are added and the mixture is stirred at room temperature for 20 minutes. The charcoal is filtered and 40 ml. of water is added. The solution is concentrated in vacuo to essentially no methanol. The product, $15\alpha,16\alpha$-dimethyl-$17\alpha,21$-dihydroxypregnane-3,11,20-trione, is filtered and dried.

When the other 15-alkyl and 15,16-dialkyl steroids of Example 19 are used in the above procedure in place of the 15α,16α-dimethyl compound, the corresponding 3-keto-15-alkyl-17α,21-dihydroxy steroid is obtained.

To a solution of 100 mg. of this product in 2 ml. of pyridine is added 0.5 ml. of acetic anhydride. The mixture is heated on a steam bath for 15 minutes. A mixture of ice and water is then added. After standing for about 30 minutes, the product is extracted into ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8) and water (until the aqueous layer is neutral). The ethyl acetate solution is then dried with anhydrous sodium sulfate, following which the solvent is removed in vacuo, and the residue is chromatographed on alumina. The product is isolated by crystallization (acetone-ether) of the appropriate benzene eluates.

When the other 15-alkyl compounds described above are similarly treated, the corresponding 21-acetates are obtained. Similarly, when propionic anhydride is substituted for acetic anhydride, the corresponding 21-propionate is obtained.

EXAMPLE 21

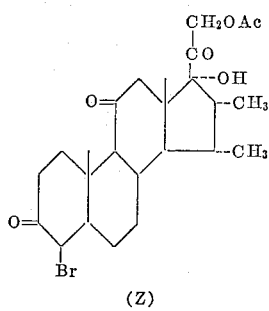

(Z)

To a stirred solution of 630 mg. of 17α,21-dihydroxy-15α,16α-dimethyl-3,11,20-pregnanetrione-21-acetate in 10 ml. of acetic acid and 8 ml. of chloroform kept at −10° C. is added 240 mg. of bromine in 6 ml. of chloroform. After addition is complete, 12 g. of sodium acetate in 7 ml. of cold water is added. Additional water is added and the mixture is extracted with chloroform. The chloroform extract is washed with dilute potassium bicarbonate, water and dried over sodium sulfate. The residue is triturated with ether to give crystalline 4-bromo-17α,21-dihydroxy-15α,16α-dimethyl - 3,11,20 - pregnanetrione 21-acetate.

When the other 15-alkyl and 15,16-dialkyl steroid 21-alkanoates of Example 20 are used in the above procedure, the correspondingly substituted products are obtained.

EXAMPLE 22

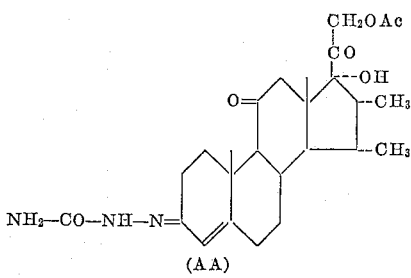

(AA)

To 580 mg. of 4-bromo-17α,21-dihydroxy-15α,16α-dimethyl-3,11,20-pregnanetrione 21-acetate in 20 ml. of acetonitrile under nitrogen is added a slurry of 300 mg. of semicarbazide hydrochloride and 200 mg. of sodium bicarbonate in 4 ml. of water. After 2 hours, the acetonitrile is removed in vacuo, water is added and the crystalline 3-semicarbazone of 17α,21-dihydroxy-15α,16α-dimethyl-4-pregnene-3,11,20-trione 21-acetate is filtered, washed with water, and dried in air.

When the other 15-alkyl and 15,16-dialkyl products of Example 21 are similarly used in the above procedure, the correspondingly substituted 3-semicarbazones are obtained.

EXAMPLE 23

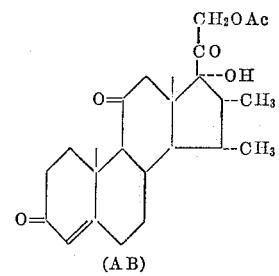

(AB)

Five hundred mg. of the semicarbazone of 17α,21-dihydroxy-15α,16α-dimethyl-4-pregnene-3,11,20 - trione 21-acetate is dissolved in 20 ml. of acetic acid, 1.5 ml. of pyruvic acid and 5 ml. of water. After 18 hours at 25° C., water is added and the mixture is extracted with chloroform. The chloroform extract is washed with aqueous potassium bicarbonate, water, and dried over sodium sulfate. Removal of the solvent gives crude 17α,21-dihydroxy - 15α,16α-dimethyl-4-pregnene-3,11,20-trione 21-acetate which is purified by crystallization from acetone-ether.

When the other 15-alkyl and 15,16-dialkyl products of Example 22 are used in the above procedure, the correspondingly substituted compounds are obtained. Among the products so prepared are 17α,21-dihydroxy-15α,16β-dimethyl,15β,16α-dimethyl, 15β,16β - dimethyl, 15α-methyl, 15β-methyl, 15α-ethyl, 15α,16β-diethyl, 15α-methyl-16β-ethyl, 15β,16β-diethyl, 15β,16β-dipropyl and 15β,16β - dibutyl-4-pregnene-3,11,20-trione-21-acetates or propionates.

EXAMPLE 24

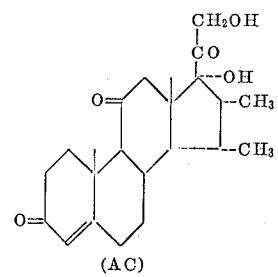

(AC)

A solution of 500 mg. of 17α,21-dihydroxy-15α,16α-dimethyl-4-pregnene-3,11,20-trione 21-acetate in 15 ml. of methanol is treated with 500 mg. of potassium bicarbonate in 5 ml. of water under nitrogen at reflux for 10 minutes. The mixture is cooled, neutralized with 0.5 ml. of acetic acid in 5 ml. of water, the methanol removed in vacuo and the product extracted into ethyl acetate. Concentration of the ethyl acetate gives crystalline 17α,21-dihydroxy - 15α,16α - dimethyl-4-pregnene-3,11,20-trione.

When the other 15-alkyl and 15,16-dialkyl products of Example 23 are substituted in the above procedure for the 15α,16α-dimethyl steroid, the corresponding steroids are obtained.

EXAMPLE 25

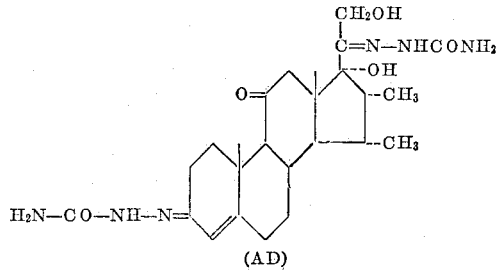

(AD)

To a stirred solution of 500 mg. of 17α,21-di-hydroxy-15α,16α-dimethyl-4-pregnene-3,11,20-trione in 12.5 ml. of methanol and 3 ml. of dimethylformamide, kept under nitrogen, is added a slurry of 680 mg. of semicarbazide hydrochloride and 370 mg. of sodium bicarbonate in 1 ml. of water. The stirred mixture is refluxed 3½ hours and maintained at 45° C. for 17 hours. It is then cooled to 20° C. and 50 ml. of 50% saturated aqueous sodium chloride is added. After two hours at 0° C. the precipitate of the 3,20-disemicarbazone of 17α,21-dihydroxy-15α,16α-dimethyl-4-pregnene - 3,11,20 - trione is filtered, washed with water until free of chloride ion and dried in air.

When the other 15-alkyl and 15,16-dialkyl steroids in Example 24 are substituted for the 15a,16a-dimethyl compound in the above procedure, the correspondingly substituted product is obtained.

EXAMPLE 26

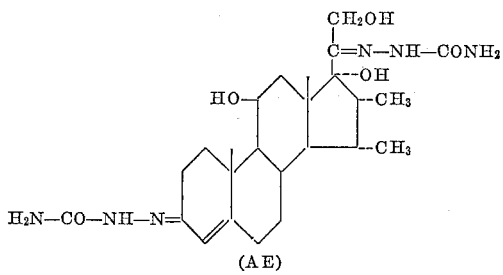

(AE)

To a stirred solution of 600 mg. of the 3,20-disemicarbazone of 17α,21 - dihydroxy - 15α,16α-dimethyl-4-pregnene-3,11,20-trione in 30 ml. of tetrahydrofuran and 11 ml. of water under nitrogen is added 200 mg. powdered sodium borohydride. The stirred suspension is refluxed 45 minutes and then cooled to 15° C. Aqueous acetic acid (3 ml. of 30%) is added cautiously and most of the tetrahydrofuran is removed in vacuum. Addition of 5 ml. of methanol and 5 ml. of water induces the product to crystallize. Following addition of 10 ml. of a saturated sodium chloride solution and aging at 0° C. the product, 3,20-disemicarbazone of 11β,17α,21-trihydroxy-15α,16α-dimethyl-4-pregnene-3,20-dione is filtered, washed with water and dried in air.

Similarly, the other 15-alkyl and 15,16-dialkyl steroids of Example 25, when used in the above procedure, give the corresponding 3,20-disemicarbazones.

EXAMPLE 27

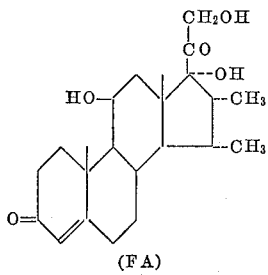

(FA)

To a solution of 510 mg. of the 3,20-disemicarbazone of 11β,17α,21 - trihydroxy-15α,16α-dimethyl-4-pregnene-3,20-dione in 5 ml. of acetic acid is added 1.20 ml. of water and 0.50 ml. of pyruvic acid. The solution is kept at 25° C. for 18 hours. Water (20 ml.) is added, and the mixture is extracted thoroughly with chloroform. The chloroform extract is dried over magnesium sulfate and taken to dryness. The residue is crystallized from acetone-ether to give pure 11β,17α,21-trihydroxy-15α,16α-dimethyl-4-pregnene-3,20-dione. The other 15-alkyl and 15,16-dialkyl steroids of Example 26, when used in the above procedure, similarly yield the corresponding 11β-hydroxy compounds.

EXAMPLE 28

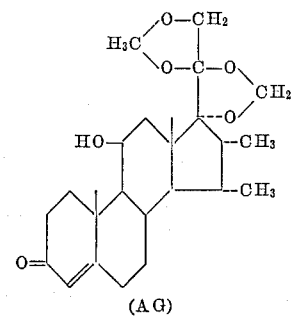

(AG)

The procedure of Example 16 is followed using the product of Example 26 as the starting material. There is thus obtained the 17,21-bismethylenedioxy of 15α,16α-dimethyl-11β,17α,21-trihydroxy-4 - pregnane - 3,20 - dione. The corresponding products are similarly prepared from the other 15-alkyl and 15,16-dialkyl products of Example 27.

EXAMPLE 29

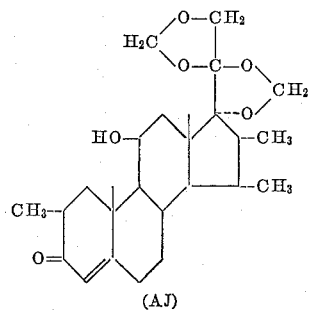

(AJ)

To 8.0 g. of the product of Example 28 suspended in 100 ml. of t-butyl alcohol is added 3.2 g. of sodium methylate. To this mixture under nitrogen is added 5 ml. of diethyl oxalate and the mixture is stirred under nitrogen for six hours. The mixture is then cooled and ether is added. The product is filtered.

A mixture of the above product, 13 g. of anhydrous potassium carbonate, 300 ml. of acetone and 50 ml. of methyl iodide is refluxed 20 hours. The mixture is filtered hot and the filtrate concentrated to a small volume. A large amount of water is then added to the concentrate and the mixture is extracted with ethyl acetate. The extract is washed with saturated sodium chloride solution and dried. Activated charcoal is added and the mixture is filtered. Evaporation of the filtrate yields a crude intermediate.

The crude intermediate thus prepared is dissolved in 250 ml. of absolute alcohol and 1.0 g. of 95% sodium methylate is added. The mixture is allowed to stand at room temperature for four hours. A few drops of acetic acid and 20 ml. of water is added and the methanol is removed under reduced pressure at a temperature not exceeding 35°. The ethyl acetate extract of the mixture is washed to neutrality with a saline solution, dried and decolorized with activated carbon to give the crude 17-bismethylenedioxy derivative of 2α,15α,16α-trimethyl-11β,17α,21-trihydroxy-4-pregnene-3,20-dione.

When ethyl iodide, propyl bromide or butyl bromide is substituted in the above procedure for methyl iodide, the corresponding 2-ethyl, propyl and butyl compounds are obtained.

When the other 15-alkyl and 15,16-dialkyl products of Example 28 are used in place of the 15α,16α-dimethyl starting material in the above procedure, the corresponding 2α,15-dialkyl and 2α,15,16-trialkyl steroid is obtained.

EXAMPLE 30

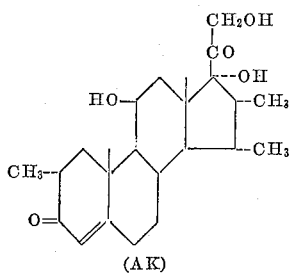

(AK)

A slurry of 970 mg. of the product of Example 29 in 97 ml. of 60% formic acid is purged six times with nitrogen and then heated on a steam cone for 15 minutes under nitrogen. The reaction mixture is cooled in an ice bath and 100 ml. of water is added. There is then added 20 g. of sodium carbonate (in approximately 20 minutes). A gummy precipitate appears which is extracted with chloroform. The chloroform solution is washed acid free with saturated sodium bicarbonate once and then washed with water. The chloroform is removed in vacuo and the residue flushed with 20 ml. of methanol and then concentrated to dryness in vacuo. The crude product is then dissolved in 45 ml. of purified methanol and purged six times with nitrogen. There is then added 1.43 ml. of 0.21 M sodium methoxide solution in methanol. The solution is stirred for seven minutes at 20–25° under nitrogen. It is then acidified with 3–4 drops of acetic acid. There is then added 5 ml. of water and 500 mg. of charcoal. The mixture is stirred at room temperature for 20 minutes. The charcoal is removed by filtration and the filtrate is diluted with 40 ml. of water. The solution is then concentrated in vacuo to essentially no When the other $2\alpha,15$-dialkyl and $2\alpha,15,16$-trialkyl droxy-4-pregnene-3,20-dione.

When the other $2\alpha,15$-dialkyl and $2\alpha,15,16$-tralkyl products of Example 29 are used in the above procedure, the correspondingly substituted compound is obtained.

EXAMPLE 31

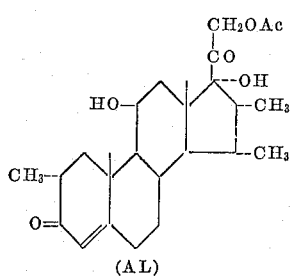

(AL)

To a solution of 100 mg. of the product of Example 30 in 2 ml. of pyridine is added 0.5 ml. of acetic anhydride. The mixture is heated on a steam bath for 15 minutes. A mixture of ice and water is then added and the reaction mixture is allowed to stand for about 30 minutes. The product is washed with water, ice-cold 1 N sulfuric acid (until the pH of the aqueous layer is 1–3), saturated aqueous sodium bicarbonate (until the pH of the aqueous layer is 8) and water (until the aqueous layer is neutral). The ethyl acetate solution is then dried with anhydrous sodium sulfate, following which the solvent is distilled at about 40° C. in vacuo. The product is then crystallized from acetone-hexane. The product is $2\alpha,15\alpha,16\alpha$-trimethyl-$11\beta,17\alpha$-trihydroxy-4-pregnene-3,20-dione 21-acetate. The corresponding $2\alpha,15$-dialkyl and $2\alpha,15,16$-trialkyl steroids are obtained by the above procedure using the other products of Example 30.

EXAMPLE 32

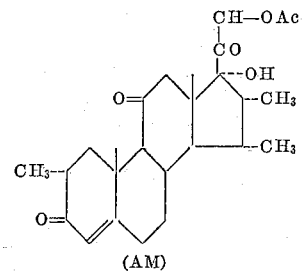

(AM)

The procedure of Example 19 is followed using the product of Example 31 as the starting material. There is thus obtained $2\alpha,15\alpha,16\alpha$-trimethyl-$17\alpha,21$-dihydroxy-4-pregnene-3,11,20-trione 21-acetate. The 21-acetates of the other products of Example 31 are similarly prepared.

EXAMPLE 33

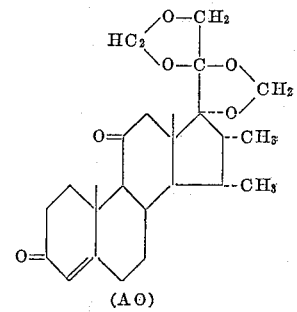

(AN)

The procedure of Example 24 is followed using the product of Example 32 as the starting material. There is thus obtained $2\alpha,15\alpha16\alpha$-trimethyl-$17\alpha,21$-dihydroxy-4-pregnene-3,11,20-trione. When the other products of Example 32 are used in the procedure of Example 24, the correspondingly substituted products, $2\alpha,15\alpha$-dimethyl-$17\alpha,21$-dihydroxy - 4 - pregnene-3,11,20-trione; $2\alpha,15\beta$-dimethyl - $17\alpha,21$ - dihydroxy - 4 - pregnene-3,11,20-trione; $2\alpha,15\alpha,16\alpha$ - trimethyl-$17\alpha,21$ - dihydroxy - 4 - pregnene-3,11,20-trione; $2\alpha,15\alpha,16\beta$-trimethyl-$17\alpha,21$-dihydroxy-4-pregnene-3,11,20-trione; $2\alpha,15\beta,16\beta$-trimethyl-$17\alpha,21$-dihydroxy-4-pregnene - 3,11,20-trione; and $2\alpha,15\beta,16\alpha$-trimethyl - $17\alpha,21$-dihydroxy-4-pregnene-3,11,20-trione, are prepared.

EXAMPLE 34

(AO)

The procedure of Example 19 is followed using the product of Example 28, the 17,21-bismethylenedioxy derivative of $15\alpha,16\alpha$-dimethyl-$11\beta,17\alpha,21$-trihydroxy-4-pregnene-3,20-dione as the starting material. There is thus obtained the corresponding 11-keto compound of the above structure. Similarly, when the 17-bismethylenedioxy derivative of $2\alpha,15\alpha,16\alpha$-trimethyl-$11,17\alpha,21$-trihydroxy-4-pregnene-3,20-dione (the product of Example 29) is used in the procedure of Example 19, the corresponding 3,11,20-trione is obtained. When the other 15-alkyl, 2,15 and 15,16-dialkyl and $2\alpha,15,16$-trialkyl compounds prepared in Examples 28 and 29 are used, the correspondingly substituted products are prepared.

EXAMPLE 35

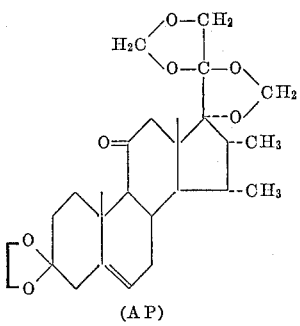

(AP)

Seventeen and one-half grams of the product of Example 34 is dissolved in 890 ml. of benzene and then 45 ml. of ethylene glycol and 1.87 g. of p-toluenesulfonic acid monohydrate added. The mixture is heated at reflux with stirring for 17.5 hours. The water being formed is continuously collected and removed. The solution is cooled to 20° and washed twice with 200 ml. of water followed by 200 ml. of saturated sodium bicarbonate solution and 200 ml. of water. Each wash is back extracted with benzene and the benzene is added to the batch. The dried benzene solution is then concentrated to dryness in vacuo. The residual product is refluxed with 100 ml. of ether for ½ hour and the mixture cooled. The product, the 3-dioxolane of the above structure, is isolated by filtration and washed with cold ether.

When the other 15-alkyl, 2α,15 and 15,16-dialkyl and 2α,15,16-trialkyl compounds prepared in Example 34 are used in the above procedure, the correspondingly substituted products are obtained.

EXAMPLE 36

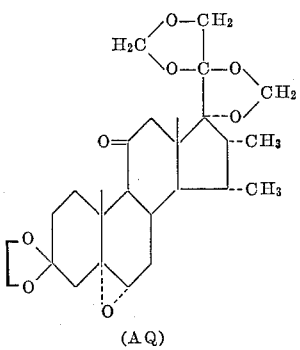

(AQ)

A solution of 22.9 g. of the product of Example 35 in 200 ml. of benzene is added to 460 ml. of perbenzoic acid solution over approximately 30 minutes while keeping the temperature at 20–25°. The mixture is allowed to stand about 48 hours at room temperature until over 100% of theory of the perbenzoic acid has been used. The solution is cooled to 10° and a 15% solution of sodium bisulfite is added with good agitation at less than 20° until a negative KI test is obtained. The aqueous phase is removed and the benzene washed acid-free with 5% sodium bicarbonate and then with water. The benzene solution is dried and concentrated in vacuo. The product (a mixture of α and β isomers) is separated by chromatography on florosil. One gram of the mixture oxides is chromatographed on 100 g. of florosil. Elution with 5% acetone in hexane gives the β isomer. The α isomer is eluted with 10% acetone in hexane and recrystallized from a benzene-hexane mixture.

When the other 15-alkyl, 2α,15 and 15,16-dialkyl and 2α,15,16-trialkyl compounds prepared in Example 35 are used in the above procedure, the correspondingly substituted products are obtained.

EXAMPLE 37

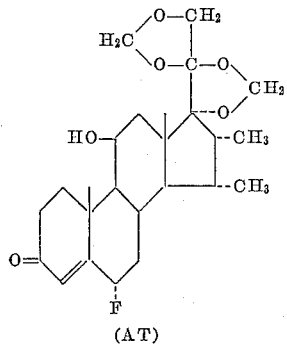

(AT)

One gram of the α-oxide produced in Example 36 is dissolved in 50 cc. of dry benzene and 50 cc. of dry ether. Freshly distilled boron trifluoride is added (0.83 cc.) and the clear solution is allowed to stand overnight at room temperature. The resulting yellow solution is added dropwise to 100 cc. of saturated aqueous sodium bicarbonate with good stirring. The layers are separated and the organic layer is washed with saturated aqueous sodium bicarbonate and then with water and dried. The solution is evaporated to dryness in vacuo leaving a yellow oil which is purified by chromatography in 100 g. of florosil. The product is eluted with 3% acetone and hexane.

To a stirred solution of 600 mg. of the product obtained in 30 ml. of tetrahydrofuran and 11 ml. of water under nitrogen is added 200 mg. of powdered sodium borohydride. The stirred suspension is refluxed 45 minutes and then cooled. Aqueous acetic acid (3 ml. of 30%) is added cautiously and most of the tetrahydrofuran is removed in vacuo. Addition of 5 ml. of methanol and 5 ml. of water induces the product to crystallize. There is then added 10 ml. of saturated sodium chloride solution at 0° C. The intermediate product is then filtered, washed with water and dried in air.

Two hundred mg. of the product thus obtained is dissolved in 10 cc. of acetone and 10 mg. of p-toluene sulfonic acid monohydrate in 1 cc. of acetone is added. The solution is allowed to stand overnight at room temperature. It is then diluted with water and extracted with ether. The combined ether extracts are washed with water, dried and the solvent removed in vacuo. The residue is passed over 4 g. of acid washed alumina. The 17,21-bismethylenedioxy derivative of 6α-fluoro-15α,16α-dimethyl - 11β,17α,21 - trihydroxy - 4 - pregnene - 3,20-dione is removed in an 8:2 ether-chloroform solution. It can be recrystallized from methylene dichloride and ether.

When the other 15-alkyl, 2α,15 and 15,16-dialkyl and 2α,15,16-trialkyl compounds prepared in Example 36 are used in the above procedure, the correspondingly substituted 6α-fluoro compounds are prepared.

EXAMPLE 38

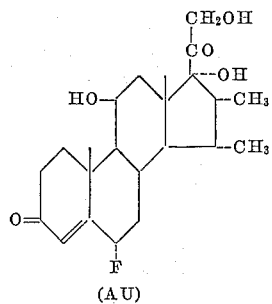

(AU)

The procedure of Example 30 is followed using as a starting material the product of Example 37. The product thus obtained is 6α-fluoro,15α,16α-dimethyl- 11β,17α,21-trihydroxy-4-pregnene-3,20-dione. When the other compounds prepared in Example 37 are used in the procedure of Example 30, there are obtained 6α-fluoro - 15α - methyl,15β - methyl,2α,15α - dimethyl,2α, 15β - dimethyl, 2α,15α16α - trimethyl, 2α,15β,16β - trimethyl, 15α,16β - dimethyl, 15β,16α - dimethyl, 15β,16β-dimethyl, 15α,16α - dimethyl, 2α - ethyl - 15α - methyl, and 2α,15α - diethyl - 11β,17α,21 - trihydroxy - 4 - pregnene-3,20-dione.

EXAMPLE 39

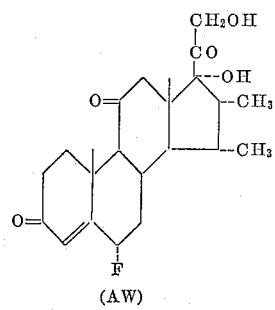

(AW)

The procedure of Example 31 is followed using the product of Example 38 as the starting material. The 21-acetate thus formed is then oxidized by the procedure of Example 19 to form the 11-keto compound and this in turn is saponified by the procedure of Example 24 to yield 9α-fluoro-15α,16α-dimethyl-17α,21-dihydroxy-4-pregnene-3,11,20-trione.

When the other products of Example 38 are used instead, the correspondingly substituted products are obtained.

Alternatively, the procedure of Example 37 with omission of the sodium borohydride reduction step, followed by removal of the 17,21-bismethylenedioxy grouping by the procedure of Example 30, may be used.

EXAMPLE 40

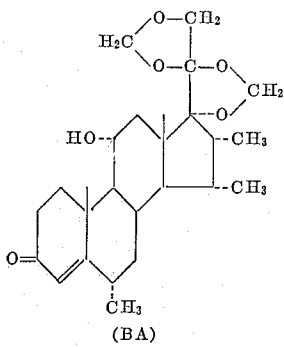

(BA)

A solution of 500 mg. of the product of Example 36 in 35 ml. of tetrahydrofuran and a solution of 750 mg. of sodium borohydride in 20 ml. of water are each purged six times with nitrogen and then combined. The solution is then stirred at room temperature under nitrogen for 18 hours after which it is cooled to 0–5°. A saturated solution of 4.7 g. of monobasic sodium phosphate is added over approximately 15 minutes. The slurry is then concentrated in vacuo to essentially no tetrahydrofuran while keeping the temperature below 45°. The slurry is washed with water until neutral.

To a solution of 250 mg. of the product thus produced in 60 ml. of dry benzene under nitrogen is added 2.33 ml. of 3 M methylmagnesium bromide in ether. The mixture is heated at 70° under nitrogen for 5 hours and then cooled to 0–5°. Ammonium chloride (5.6 g.) in 56 ml. of water is added over approximately 20 minutes. The benzene is separated and the aqueous layer is extracted with two 20 ml. portions of benzene. The combined benzene solutions are washed neutral with water, dried with magnesium sulfate and concentrated to dryness. The crude product may be used in the next reaction, but, if desired, can be crystallized from ether, benzene or methanol.

A solution of 2 g. of the product thus formed in 100 ml. of methanol is purged four times with nitrogen. 10.9 ml. of 8% sulfuric acid is added. The mixture is purged four times with nitrogen and then heated under nitrogen at reflux. The mixture is cooled to 0–5°. A solution of 10.9 g. of sodium carbonate in 300 ml. of water is added with cooling and good agitation. The gummy precipitate is extracted with chloroform and the extract is washed with water, dried and concentrated in vacuo. This crude product is used as is for the next reaction but can be recrystallized from methanol or ethanol.

A solution of 2 g. of the product thus obtained in 100 ml. of methanol is purged four times with nitrogen and then 4.2 ml. of 5% potassium hydroxide in methanol is added. The mixture is again purged four times with nitrogen. The solution is then cooled to 20° and acidified with a few drops of glacial acetic acid. Twenty-five ml. of water is added and the solution is concentrated in vacuo to essentially no methanol. The crystallized product is isolated by filtration, washed with water and dried. It is the 17-bis-methylenedioxy derivative of 6α,15α,16α-trimethyl-11β,17α,21-trihydroxy-4-pregnene-3,20-dione.

When the other 15-alkyl, 2α,15- and 15,16-dialkyl and 2α,15,16-trialkyl products of Example 36 are used in the above procedure, the correspondingly substituted 6α-methyl compounds are obtained.

When the methylmagnesium bromide in the second paragraph of the above procedure is replaced by an equivalent amount of ethyl, propyl, or butyl magnesium bromide in any of the above procedures, the correspondingly substituted 6α-ethyl, propyl, and butyl compounds are obtained.

EXAMPLE 41

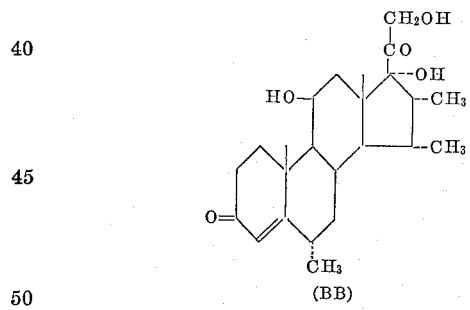

(BB)

The procedure of Example 30 is followed using the product of Example 40 as the starting material to yield 6α,15α,16α-trimethyl-11β,17α,21-trihydroxy-4 - pregnene-3,20-dione. When the other compounds prepared in Example 40 are used instead, the correspondingly substituted product is obtained.

EXAMPLE 42

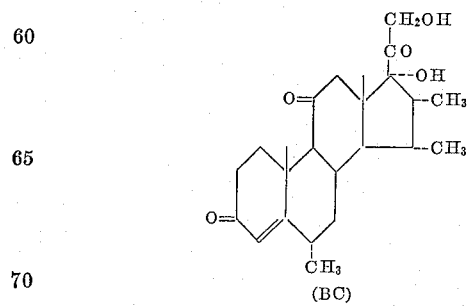

(BC)

The procedure of Example 39 is followed using the product of Example 41 as the starting material to produce 6α,15α,16α-trimethyl-17α,21-trihydroxy-4-pregnene-3,11,20-triole. When the other products of Example 39 are used, the correspondingly substituted steroids are obtained.

EXAMPLE 43

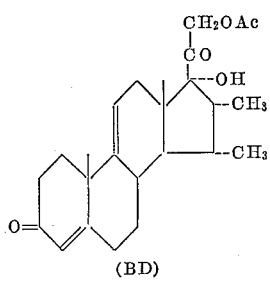

(BD)

A solution of 400 mg. of 15α,16α-dimethyl-11β,17α,21-trihydroxy-4-pregnene-3,20-dione (the product of Example 27) is acetylated at position 21 as in Example 21. The 21-acetate is dissolved in 2 ml. of dimethylformamide, 0.8 ml. of pyridine and 0.4 ml. of methanesulfonyl chloride, and the mixture kept at 75° C. for one hour. The mixture is cooled, water is added and the precipitate is cooled and dried in air. The desired 15α,16α-dimethyl-17α,21-dihydroxy-4-(9,11)-pregnadiene-3,20-dione 21-acetate is purified by chromatography on alumina and elution of the column with benzene. Crystallization of the benzene eluate gives the desired compound.

When the other 15-alkyl, 2α,15-dialkyl, 6α,15-dialkyl, 15,16-dialkyl, 2α,15,16-trialkyl, 6α,15,16-trialkyl, 2α,6α,15-trialkyl and 2α,6α,15,16-tetraalkyl compounds produced in Examples 27, 30 and 41 and the various 6α-fluoro compounds produced in Example 38 are used in the above procedure, the correspondingly substituted products are obtained.

EXAMPLE 44

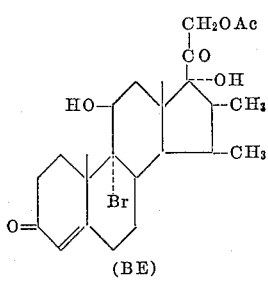

(BE)

To a mixture of 620 mg. of the product of Example 43 and 330 mg. of n-bromosuccinimide in 10 ml. of dioxane and 3.2 ml. of water cooled to 10° C. is added 1.8 ml. of cold 1 M aqueous perchloric acid. The mixture is stirred at 15° C. for three hours. Excess N-bromosuccinimide is destroyed by the addition of aqueous sodium thiosulfate and most of the dioxane is removed in vacuo. About 30 ml. of water is added and the crystalline bromohydride is isolated by filtration, washed with water and dried.

When the other compounds produced in Example 43 are used in the above procedure, the correspondingly substituted product is obtained.

EXAMPLE 45

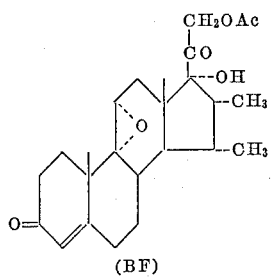

(BF)

A solution of 210 mg. of the product of Example 44 and 240 mg. of potassium acetate in 10 ml. of absolute ethanol is heated under reflux for two hours. The reaction mixture is cooled to room temperature and evaporated in vacuo to a small volume. The concentrated aqueous mixture is extracted with three portions of ethyl acetate and the combined ethyl acetate extracts are washed with water, dried and evaporated to dryness in vacuo. The residual material is crystallized from ethyl acetate and ether to give 15α,16α-dimethyl-9,11β-epoxy-4-pregnene-17α,21-diol-3,20-dione 21-acetate.

To a stirred solution of 100 mg. of the above product in 8 ml. of tetrahydrofuran and 1 ml. of methanol under nitrogen is added 1.02 ml. of 0.215 N methanolic sodium methoxide. After 10 minutes at 20° C., 0.2 ml. of acetic acid is added and the methanol is removed in vacuo. The residue is acetylated with 1.00 ml. of pyridine and 0.5 ml. of acetic anhydride at 60° C. for 70 minutes, the mixture is evaporated to dryness, water is added and the product is extracted into chloroform. The residue is crystallized from ether and acetone to give the pure compound.

When the other products of Example 44 are used in the above procedure, the correspondingly substituted products are obtained.

EXAMPLE 46

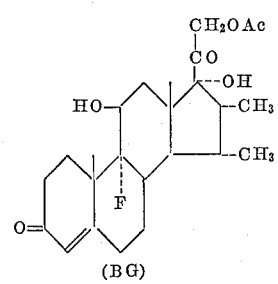

(BG)

To a solution of 200 mg. of 15α,16α-dimethyl-9β,11β-epoxy-17α,21-dihydroxy-4-pregnene-3,20-dione 21-acetate in 2 ml. of chloroform and 2 ml. of tetrahydrofuran in a polyethylene bottle at −60° C. is added 2 ml. of 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue is crystallized with acetone and ether and gives the pure 9α-fluoro-15α,16α-dimethyl-11β,17α,21-trihydroxy-4-pregnene-3,20-dione-21-acetate.

When the other products of Example 45 are used in the above procedure, the correspondingly substituted compounds are obtained.

EXAMPLE 47

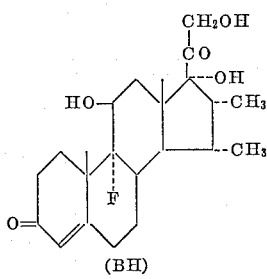

(BH)

The procedure of Example 24 is followed using 9α-fluoro-15α,16α-dimethyl-11β,17α,21-trihydroxy-4-pregnene-3,20-dione-21-acetate, the product of Example 46 as the starting material, the product obtained is the corresponding free 21-hydroxy steroid.

Similarly, when the other products of Example 46 are used in the above procedures, the correspondingly substituted products are obtained.

EXAMPLE 48

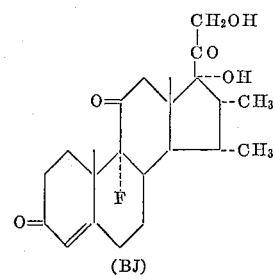

(BJ)

The procedure of Example 19 is followed using 9α-fluoro-15α,16α-dimethyl - 11β,17α,21 - trihydroxy-4-pregnene-3,20-dione 21-acetate (the product of Example 46) as the starting material. This produces 9α-fluoro-15α,16α-dimethyl-17α,21-dihydroxy - 4 - pregnene - 3,11,20-dione 21-acetate. The procedure of Example 24 is then followed using this compound as the reactant to form the corresponding free 21-hydroxy steroid.

When the other products of Example 46 are used in the above procedure, the correspondingly substituted compounds are obtained.

EXAMPLE 49

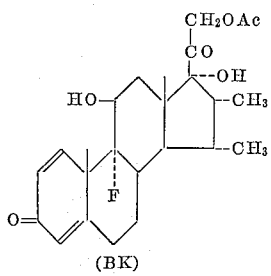

(BK)

To 100 mg. of 9α-fluoro-15α,16α-dimethyl-11β,17α,21-trihydroxy-4-pregnene-3,20-dione 21-acetate (the product of Example 46) in 5 ml. of t-butanol and 0.1 ml. of acetic acid, there is added 50 mg. of selenium dioxide. The mixture is refluxed under nitrogen for 18 hours. Another 50 mg. of selenium dioxide is added and the mixture is refluxed an additonal 24 hours. The mixture is filtered and the filtrate is evaporated to dryness. The residue is taken up in ethyl acetate and washed successively with aqueous sodium bicarbonate, ammonium sulfide, dilute ammonia water, water, dilute hydrochloric acid and water and then dried over magnesium sulfate. The mixture is then treated with activated charcoal, filtered, and the filtrate is evaporated to dryness. Crystallization of the residue from acetone and ether gives pure 9α-fluoro-15α,16α-dimethyl-11β,17α,21 - trihydroxy - 1,4-pregnadiene-3,20-dione 21-acetate.

When the other products of Example 46 are used in the above procedure, the correspondingly substituted products are obtained.

EXAMPLE 50

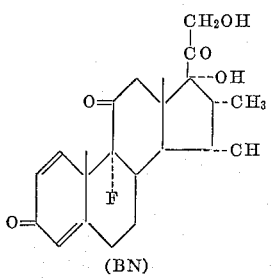

(BN)

The procedure of Example 19 is followed using the product of Example 49 as the starting material to yield the corresponding 11-keto-21-acetate. This is then used in the procedure of Example 24 to give the free 21-hydroxy steroid having an 11-keto group. When the procedure of Example 24 is followed using the product of Example 49 as the starting material, the free 21-hydroxy steroid having an 11β-hydroxyl is obtained.

When the above procedures are followed using the other products of Example 49, the correspondingly substituted steroids are obtained.

EXAMPLE 51

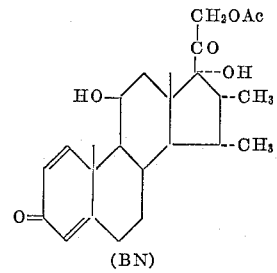

(BN)

The procedure of Example 49 is followed using as the starting material the product of Examples 27 and 31 to yield the corresponding 1,4-diene. When the products of Examples 38 and 41 are used as the starting material in the procedure of Example 31 and the steroids thus obtained are used in the procedure of Example 49, similar products are obtained.

EXAMPLE 52

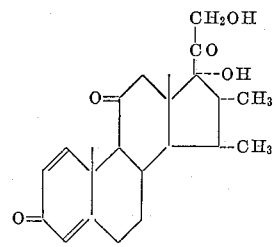

The procedure of Example 19 is followed using the product of Example 51 as the starting material to yield the corresponding 11-keto compound. When this is then used in the procedure of Example 24, the corresponding 11-keto-21-hydroxy steroid is obtained. When the product of Example 51 is used directly in the procedure of Example 24, the corresponding 11β-hydroxy-21-hydroxy steroid is obtained.

We claim:
1. Compound of the formula—

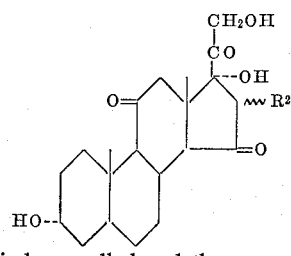

in which $R^2$ is lower alkyl and the wavy line joining $R^2$ to the ring shows selection from the group consisting of α and β substituents.

2. 16α-methyl-3α,17α,21-trihydroxypregnane-11,15,20-trione.
3. 16β-methyl-3α,17α,21-trihydroxypregnane-11,15,20-trione.
4. 2,15 - dimethyl - 17α,21-dihydroxy-1,4-pregnadiene-3,11,20-trione.
5. 2,15 - dimethyl - 9α-fluoro-17α,21-dihydroxy-1,4-pregnadiene-3,11,20-trione.
6. 2,15,16 - trimethyl - 17α,21-dihydroxy-1,4-pregnadiene-3,11,20-trione.
7. 2,15,16 - trimethyl - 9α-fluoro-17α,21-dihydroxy-1,4-pregnadiene-3,11,20-trione.

8. A process of preparing a compound of the structure—

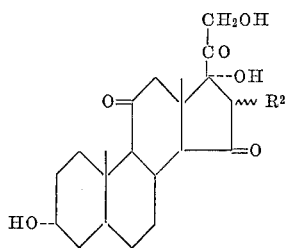

in which $R^2$ is lower alkyl and the wavy line shows selection from the group consisting of $\alpha$ or $\beta$ substitution which comprises converting a compound of the structure—

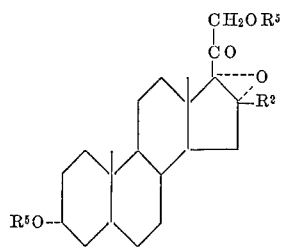

in which $R^5$ is lower alkanoyl into a 15-bromo derivative thereof by treating said starting compound with HBr in acetic acid to form a 15-bromo-16-alkyl-$\Delta^{16}$ compound and oxidizing said $\Delta^{16}$ compound with a peracid, then reacting said 15-bromo derivative of said starting compound with a potassium alkanoate to form the corresponding 15-alkanoyloxy derivative, treating said 15-alkanoyloxy derivative with a strong acid to form a mixture of the corresponding 15-alkanoyloxy-16-methylene-17$\alpha$-hydroxy and 15-alkanoyloxy-16-methyl-17$\alpha$-hydroxy-$\Delta^{15}$ steroids, separating said $\Delta^{15}$ steroid by crystallization and saponifying it by heating with a caustic to form the desired 15-ketone of the above structure.

9. A process of preparing a 3,20-diketo-17-hydroxy-11,21-bisoxygenated-15-alkyl steroid of the pregnane series which comprises treating the corresponding 15-keto steroid with an alkylidenyl triphenyl-phosphonium halide to form the corresponding 15-alkylidenyl steroid, and reducing the said alkylidenyl compound by catalytic hydrogenation.

References Cited in the file of this patent

UNITED STATES PATENTS

| | | |
|---|---|---|
| 2,879,218 | Sebek et al. | July 28, 1959 |
| 3,004,994 | Arth et al. | Oct. 17, 1961 |

OTHER REFERENCES

Fieser et al.: Steroids, 1959, pages 603, 646, 686, 694 and 695, Reinhold Publishing Co. New York, N.Y.